(12) United States Patent
Zheng et al.

(10) Patent No.: US 11,948,344 B2
(45) Date of Patent: Apr. 2, 2024

(54) METHOD, SYSTEM, MEDIUM, EQUIPMENT AND TERMINAL FOR INLAND VESSEL IDENTIFICATION AND DEPTH ESTIMATION FOR SMART MARITIME

(71) Applicant: Wuhan University of Technology, Wuhan (CN)

(72) Inventors: Yuanzhou Zheng, Wuhan (CN); Long Qian, Wuhan (CN); Jingxin Cao, Wuhan (CN); Xinyu Liu, Wuhan (CN); Xuemeng Lv, Wuhan (CN); Lei Li, Wuhan (CN); Shiquan Qin, Wuhan (CN)

(73) Assignee: Wuhan University of Technology, Wuhan (CN)

( * ) Notice: Subject to any disclaimer, the term of this patent is extended or adjusted under 35 U.S.C. 154(b) by 0 days.

(21) Appl. No.: 18/325,069

(22) Filed: May 29, 2023

(65) Prior Publication Data

US 2024/0013505 A1 Jan. 11, 2024

(30) Foreign Application Priority Data

Jul. 11, 2022 (CN) .......................... 202210810325.0

(51) Int. Cl.
*G06V 10/44* (2022.01)
*G06T 7/80* (2017.01)
*G06V 10/774* (2022.01)

(52) U.S. Cl.
CPC .............. *G06V 10/454* (2022.01); *G06T 7/80* (2017.01); *G06V 10/774* (2022.01)

(58) Field of Classification Search
CPC ....... G06V 10/454; G06V 10/774; G06T 7/80
See application file for complete search history.

(56) References Cited

U.S. PATENT DOCUMENTS 6,064,924 A * 5/2000 Fleischmann ......... G01S 13/956
701/16
2019/0096069 A1* 3/2019 Qian ......................... G06T 7/74
(Continued)

FOREIGN PATENT DOCUMENTS

| CN | 107884767 A | 4/2018 |
| CN | 113569667 A | 10/2021 |
| CN | 113989613 A | 1/2022 |

OTHER PUBLICATIONS

Zheng, Yabo "A Ship Ranging and Positioning System Based on Binocular Vision Technology" Journal of Physics. Conference Series (Year: 2020).*

(Continued)

*Primary Examiner* — Molly Wilburn
(74) *Attorney, Agent, or Firm* — Nitin Kaushik

(57) ABSTRACT

The present invention relates to the field of inland vessel identification and ranging technology, and discloses a method, system, medium, equipment and terminal for identifying and ranging inland vessels. In the stage of vessel identification, based on the classical YOLO-V4 network model, the MobileNetV1 network is used to replace the feature extraction network CSPDarknet53 of the YOLO-V4 model; In the stage of vessel ranging, a binocular stereo vision ranging model is established, and the FSRCNN is used for super-resolution reconstruction of the original image pairs to enhance the vessel feature information; the ORB algorithm is used to achieve feature detection and matching at the sub-pixel level to obtain the parallax value between image pairs, and the depth information of the vessel target is obtained by triangulation principle and coordinate conversion.

5 Claims, 19 Drawing Sheets

(56) References Cited

U.S. PATENT DOCUMENTS

2020/0074239 A1* 3/2020 Park ..................... G06F 18/217
2020/0126239 A1* 4/2020 Qian ..................... G01S 3/7864

OTHER PUBLICATIONS

Feng, Mingchi "Object Detection and Localization Based on Binocular Vision for Autonomous Vehicles" Journal of Physics. Conference Series. (Year: 2020).*

Title of the Item: Transducer and Microsystem Technologies Publication Date: Jan. 1, 2020 Name of the Author: Lei Weimin et al. Article Title: Optimization research of image super resolution reconstruction algorithm based on FSRCNN pp. 54-57.

Title of the Item: Laser and Optoelectronics Progress Publication Date: Nov. 25, 2021 Name of the Author: Hua Chunjian et al. Article Title: Binocular Ranging Method Based on Improved ORB-RANSAC pp. 1-8.

* cited by examiner

METHOD, SYSTEM, MEDIUM, EQUIPMENT AND TERMINAL FOR INLAND VESSEL IDENTIFICATION AND DEPTH ESTIMATION FOR SMART MARITIME

CROSS-REFERENCE TO RELATED APPLICATIONS

The application claims priority to Chinese patent application No. 2022108103250, filed on Jul. 11, 2022, the entire contents of which are incorporated herein by reference.

TECHNICAL FIELD

The present invention relates to the field of inland vessel identification and ranging technology, in particular to a method, system, medium, equipment and terminal for identifying and ranging inland vessels.

BACKGROUND

Economic globalization is constantly deepening in the 21st century. Waterway transportation, as an important mode of transportation, carries nearly 90% of the global bulk trade in freight, which greatly promotes the development of the world and regional economies. At present, the shipping industry has made significant progress in China, with the number of vessels in the ocean, especially those in inland rivers, increasing year by year. While promoting national economic development, it has also led to a continuous increase in vessel traffic accidents. Therefore, it is a key issue to improve the navigation safety of vessels in ports or waters with high traffic density and complex conditions. Vessel Traffic Service (VTS) can be used to effectively monitor the navigation situation of vessels and reduce the occurrence of maritime traffic accidents to a certain extent. However, the complex and ever-changing environment of inland rivers and high concentration of vessels in waterways greatly limit the role of VTS. The key to safe navigation of a vessel lies in the effective perception of the surrounding navigation environment and the ability of the pilot to make timely and correct decisions based on the information he/she received. Automatic Identification System (AIS) is currently the main environmental perception method in the shipping industry. However, due to the frequent occurrence of some vessels not maintaining AIS in normal working conditions according to regulations and not inputting accurate information of their own vessels into the equipment as required, it has a certain impact on the navigation safety of vessels. Therefore, how to make up for the shortcomings of existing perception methods and further improve maritime supervision capabilities has become a hot issue in the field of vessel safety.

The intelligent shipping has gradually become a new development trend, and countries around the world are conducting research on the intelligent water transportation. They use various sensors, communication devices, and other methods to intelligently perceive and receive information on ship data, navigation environment, ports and docks. They use big data, machine learning, image processing, pattern identification, and other methods to effectively process information for analysis, evaluation and decision-making, to improve the navigation safety of vessels. Computer Vision, as an interdisciplinary discipline, has further promoted the development of intelligent shipping.

As a branch of Computer Vision, Binocular Stereo Vision is gradually maturing. It mainly consists of three parts: binocular camera calibration, image stereo matching and depth calculation. By simulating human "eyes", two cameras simultaneously capture the same target scene, directly process the surrounding environment information, and realize the identification and ranging of targets in 3D scenes by the triangulation principle. This technology has a simple structure, high flexibility and reliability, and is widely used in 3D image reconstruction, robot navigation and quality inspection of industrial products. The University of Washington and Microsoft installed binocular stereo vision on the Mars Reconnaissance Orbiter. By capturing star images at different positions and using coordinate conversion to restore the 3D coordinates of spatial points, a more accurate celestial landscape can be obtained. Ma et al. combined UAV with binocular stereo vision perception technology to construct an automatic detection system for transmission lines, achieving automatic real-time detection of transmission line components with good robustness and accuracy. Zhang established a target ranging model based on deep learning and binocular vision. The internal and external parameters of the camera are obtained through calibration, and the Faster R-CNN algorithm is used to recognize the target. The obtained feature points are brought into the binocular stereo model to obtain the depth information of the target object. However, this model only achieves identification and ranging of a single target, and its applicability is weak. Ding proposed a reliable and stable moving target localization method based on binocular stereo vision. Firstly, the O-DHS algorithm is used to separate the identified target from a complex background, the S-DM algorithm is used to perform depth matching on the extracted feature points, and finally, distance and 3D coordinates are calculated through coordinate conversion. This method has high positioning and identification accuracy, but the algorithm takes a long time to execute and has poor results in complex environments. Based on the principle of binocular stereo vision, Li established a non-contact displacement measurement system that uses template matching to extract the image coordinates of measurement points, and restores their spatial position information through Euclidean 3D reconstruction, which greatly improves the practicality of the measurement system. However, this algorithm is sensitive to the size of template matching, which affects the calculation of the position information to a certain extent. Liu focused on camera calibration in binocular stereo vision and proposed an online calibration method based on dual parallel cylindrical targets and linear laser projectors. This method does not require feature points or contour information of the target image. By obtaining laser stripes of the target image, the camera calibration process can be completed. However, the computational cost of the algorithm is high and its universality is weak. The existing technology proposed a high-speed stereo matching algorithm suitable for ultra-high resolution binocular images, which matches close range targets with small-sized images and distant targets with large-sized images. By combining the results of hierarchical matching, the disparity map of the left and right images is obtained. The matching cost is calculated through the image pyramid strategy, which greatly reduces the time consumption in the matching process. However, its matching accuracy needs to be further improved.

The traditional YOLOv4 network structure is too large, and the number of parameters computed is also very large, making the trained network model of large size, which is not suitable for target detection on devices with insufficient computing power and memory. Therefore, it is urgent to design a new method for identifying and ranging inland vessels.

The above analysis shows that the problems and defects of the existing technology are:

(1) The existing target identification and ranging methods only achieve the identification and ranging of a single target, which is weak in applicability; meanwhile, the algorithm takes longer to execute and is less effective in complex environments.

(2) The existing target identification and ranging methods are sensitive to the size of template matching, which affects the calculation of position information; The algorithm has a high computational cost, weak universality and low matching accuracy.

(3) The traditional YOLOv4 network has a large structure and a huge number of computational parameters, and the trained network model has a large scale, which is not suitable for target detection on devices with insufficient computing power and memory.

SUMMARY

In response to the problems existing in the existing technology, the present invention provides a method, system, medium, equipment and terminal for identifying and ranging inland vessels, in particular to a method, system, medium, equipment and terminal for identifying and ranging inland vessels based on binocular stereo vision.

The present invention is implemented as follows: a method for identifying and ranging inland vessels, comprising:

In the stage of vessel target identification, MobileNetV1 network is used as the feature extraction module of YOLO-V4 model; In the stage of vessel target ranging, the feature detection and matching algorithm based on sub-pixel level is proposed based on ORB algorithm, and FSRCNN algorithm is used for super-resolution reconstruction of the original image.

Furthermore, the said method for identifying and ranging inland vessels includes:

In the stage of vessel identification, based on the classical YOLO-V4 network model, the MobileNetV1 network is used to replace the feature extraction network CSPDarknet53 of the YOLO-V4 model; In the stage of vessel ranging, a binocular stereo vision ranging model is established, and the FSRCNN is used for super-resolution reconstruction of the original image pairs to enhance the vessel feature information; the ORB algorithm is used to achieve feature detection and matching at the sub-pixel level to obtain the parallax value between image pairs, and the depth information of the vessel target is obtained by triangulation principle and coordinate conversion.

Furthermore, the said method for identifying and ranging inland vessels comprises the following steps:

Step 1: Building a binocular stereo vision ranging model;
Step 2: Building a camera calibration model;
Step 3: Building a MobilenetV1-YOLOv4 vessel identification model;
Step 4: Performing vessel feature point detection and matching.

Furthermore, the building of a binocular stereo vision ranging model in Step 1 includes:

The binocular stereo vision ranging technology perceives the depth of the surrounding environment through anthropomorphic methods and acquires 3D information about the target in the real world. According to the triangulation principle, two parallel and co-planar cameras are used to capture and image the same scene from different angles, and the depth information is recovered by calculating the parallax value between the image pairs. The optical center positions of the left and right cameras are $O_l$ and $O_r$, respectively, and $O_l X_l Y_l Z_l$ and $O_r X_r Y_r Z_r$ are the coordinate systems of the left and right cameras; b is the horizontal distance between the optical center $O_l$ and $O_r$, known as the baseline distance; The focal length of the camera is f; For the 3D space point P(X,Y,Z) the projection point coordinates in the imaging coordinate system of the left and right cameras are $p(x_l, y_l)$ and $p(x_r, x_r)$, respectively. Project the 3D model onto the XOZ plane. According to the principle of triangle similarity, it can be concluded that:

$$\begin{cases} \dfrac{z}{f} = \dfrac{x}{x_l} \\ \dfrac{z}{f} = \dfrac{x-b}{x_r} \\ \dfrac{z}{f} = \dfrac{y}{y_l} = \dfrac{y}{y_r}; \end{cases}$$

The calculation leads to:

$$\begin{cases} z = \dfrac{f*b}{x_l - x_r} = \dfrac{f*b}{d} \\ x = \dfrac{x_l * z}{f} \\ f = \dfrac{y_l * z}{f} \text{ or } f = \dfrac{y_r * z}{f}; \end{cases}$$

Where, $x_l - x_r$ is called parallax d, which represents the offset of point P from the corresponding projection point on the left and right cameras; z is the depth value of point P; When parameters f and b are determined, the depth z of the target point is obtained by calculating the difference between the coordinates x or y of the target point in the pixel coordinate system of the left and right cameras.

Calculate the projection point coordinates $p_l(x_l, y_l)$ and $p_r(x_r, y_r)$ of the point on the left and right camera imaging planes, and obtain the 3D information of the point through the transformation between coordinate systems, thereby obtaining the depth information of the target point P.

The building of a camera calibration model in Step 2 includes:

According to the principle of pinhole imaging, when a point $P_w(X_w, Y_w, Z_w)$ is located in the 3D world coordinate system, the projection coordinate of the point in the camera coordinate system is $P_c(X_c, Y_c, Z_c)$, the coordinate in the image coordinate system is P(x,y), the coordinates P(u,v), and $O_c$ in the pixel coordinate system are the camera optical center position, and $O_c Z_c$ is the camera optical axis. The mathematical expression between $P_w(X_w, Y_w, Z_w)$ and pixel coordinate P(u,v) is:

$$Z_c \begin{pmatrix} u \\ v \\ 1 \end{pmatrix} = \begin{pmatrix} \dfrac{1}{dx} & 0 & u_0 \\ 0 & \dfrac{1}{dy} & v_0 \\ 0 & 0 & 1 \end{pmatrix} \begin{pmatrix} f & 0 & 0 & 0 \\ 0 & f & 0 & 0 \\ 0 & f & 0 & 0 \end{pmatrix} \begin{pmatrix} R & T \\ \vec{0} & 1 \end{pmatrix} \begin{pmatrix} X_w \\ Y_w \\ Z_w \\ 1 \end{pmatrix} =$$

$$\begin{pmatrix} f_x & 0 & u_0 & 0 \\ 0 & f_y & v_0 & 0 \\ 0 & 0 & 1 & 0 \end{pmatrix} \begin{pmatrix} R & T \\ \vec{0} & 1 \end{pmatrix} \begin{pmatrix} X_w \\ Y_w \\ Z_w \\ 1 \end{pmatrix};$$

Let $$K = \begin{pmatrix} f_x & 0 & u_0 & 0 \\ 0 & f_y & v_0 & 0 \\ 0 & 0 & 1 & 0 \end{pmatrix},$$

referred to as the internal parameter matrix of the camera, then the mathematical expression between $P_w(X_w,Y_w,Z_w)$ and pixel coordinate $P(u,v)$ is simplified as follows:

$$Z_c \begin{pmatrix} u \\ v \\ 1 \end{pmatrix} = K \begin{pmatrix} R & T \\ \vec{0} & 1 \end{pmatrix} \begin{pmatrix} X_w \\ Y_w \\ Z_w \\ 1 \end{pmatrix};$$

Where, $$f_x = \frac{f}{d_x}, f_y = \frac{f}{d_y}, d_x \text{ and } d_y$$

respectively represent the physical dimensions of each pixel in the X and Y directions of the image plane, $u_0$ and $v_0$ represent the coordinates of the image center point, R represents the rotation matrix, and T represents the translation vector, which constitute the external parameter matrix $$\begin{pmatrix} R & T \\ \vec{0} & 1 \end{pmatrix}$$

of the camera, and the external parameter matrix and internal parameter matrix of the camera can be obtained by the camera calibration.

Furthermore, the building of a MobilenetV1-YOLOv4 vessel identification model in Step 3 includes:

Building a vessel target identification model based on the YOLOv4 model, with a network structure consisting of Backbone, Neck and Head. The YOLOv4 uses CSPMarket53 as the backbone network for feature extraction, combined with Cross Stage Partial (CSP) and residual network. The Neck module consists of a spatial pyramid pooling and a path aggregation network, and the spatial pyramid pooling consists of three different scale pooling layers: 5×5, 9×9 and 13×13. The path aggregation network serves as a feature fusion module, adding bottom-up paths on top of the feature pyramid network; and uses the Head module to detect targets and output feature maps 13×13, 26×26 and 52×52 of different sizes.

If the size of the input image is $D_K \times D_K$, the input channel is M, the number of convolutional kernels is N, and the convolutional kernel size is $D_F D_F$, then the output feature map size is $D_C \times D_C$, and the output channel is N.

In traditional convolutional operations, the number of parameters that need to be calculated is:

Params1=$D_F \times D_F \times M \times N$;

The calculation of the parameters for depth-wise separable convolution is divided into two parts: one is the depth convolution parameter, and the other is the point convolution parameter, where the size of the point convolution kernel is 1×1. Therefore, the parameters to be calculated are:

Params2=$D_F \times D_F \times M + M \times N$;

The ratio of parameters between depth-wise separable convolution and standard convolution methods is:

$$\frac{Params2}{Params1} = \frac{D_F \times D_F \times M + M \times N}{D_F \times D_F \times M \times N} = \frac{1}{N} + \frac{1}{D_F^2};$$

The MobileNetv1 is based on a depth-wise separable convolution module, which uses a 3×3 convolution kernel to perform depth convolution and extract feature information. A BN layer and a ReLU layer are connected between depth convolution and point convolution, and feature information is output through a BN layer and a ReLU layer after point convolution. The MobileNetv1 has a total of 28 layers. The first layer is a standard 3×3 convolution, with 13 depth-wise separable convolution modules built. Before the fully connected layer, an average pooling layer is used to reduce the spatial resolution to 1, and the softmax layer is used to output probability for each category to be identified.

Replace the backbone network Dark net53 of YOLOv4 with MobileNetv1, connect the three different scale feature layers extracted by MobileNetv1 with the spatial pyramid pooling and path aggregation network module of the traditional YOLOv4 model, and build the Mobilenetv1-YOLOv4 target detection model.

Furthermore, the vessel feature point detection and matching in Step 4 includes:

The FSRCNN model consists of five parts: feature extraction, reduction, mapping, amplification and deconvolution. The first four parts are convolutional layers, and the last part is deconvolution layers.

The FSRCNN directly takes the original low resolution image as the input, and uses the parameter rectified linear unit (PReLU) as the activation function, as shown in Equation (8). The FSRCNN uses d 5×5 sized convolutional kernel for feature extraction, s 1×1 sized convolutional kernel for shrinkage, m 3×3 sized convolutions concatenated as mapping layers, and d 1×1 sized convolutional kernels for expansion. At the end of the network, one 9×9 sized convolutional kernel is used for deconvolution to obtain high-resolution images;

PReLU is shown as in the following equation:

$$f(x_i) = \begin{cases} x_i, & x_i > 0 \\ a_i x_i, & x_i \leq 0 \end{cases};$$

The mean square error is used as the loss function during FSRCNN training, as shown in the following equation:

$$loss = \min_\theta \frac{1}{n} \sum_{i=1}^n \| F(Y_s^i; \theta) - X^i \|_2^2;$$

Where, $Y_s^i$ and $X^i$ are the i-th pair of super-resolution images and low-resolution images in the training data, respectively. $F(Y_s^i;\theta)$ is the network output, $\theta$ is the hyperparameter in the network.

The ORB algorithm is used to quickly create feature vectors for key feature points in an image, in order to identify corresponding targets in the image, including the following steps:

(1) Feature Point Extraction

The ORB algorithm uses the FAST algorithm to find significant feature points in the image. If a pixel in the image differs significantly from enough neighboring pixels, the pixel may be the feature point. The specific steps are as follows:

1) Select a pixel point P in the image to be detected, with a pixel value of $I_P$ and a circle centered on P with a radius of 3. There are 16 pixels on the determined circle, represented as $P_1, P_2, \ldots, P_{16}$, respectively;
2) Determine a threshold: t;
3) Calculate the difference between all pixel values on the determined circle and the pixel values of P. If there are consecutive N points that satisfy the following equation, where $I_x$ represents a point among the 16 pixels on the circle, and the point $I_x$ is used as a candidate point, let N=12; For each pixel, the 1st, 9th, 5th, and 13th pixel points are detected. If at least three of the four points meet the following equation, the points are candidate detection points, and maximum suppression is used to delete excess candidate points:

$$\begin{cases} I_x - I_p > t \\ I_x - I_p < -t \end{cases}$$

(2) BRIEF Descriptor Creation

The ORB algorithm uses BRIEF to create binary descriptors for the detected key feature points, describing feature vectors that only contain 0 and 1. The specific steps are as follows:

1) The image to be detected is processed by Gaussian filter;
2) BRIEF takes the candidate feature point P as the center point, takes a S×S sized area, randomly selects two points $P_x$ and $P_y$ within the area, compares the pixel sizes of the two points, and assigns the following values:

$$\tau(p; x, y) := \begin{cases} 1, & p(x) < p(y) \\ 0, & p(x) \geq p(y) \end{cases};$$

Where, $P_x$ and $P_y$ are the pixel values of random points $x(u_1, v_1)$ and $y(u_2, v_2)$ in the area, respectively;
3) Randomly select n pixel pairs in the area of S×S and repeat binary assignment. The encoding process is the description of the feature points in the image, which is the feature descriptor. The value of n is 128, 258 or 512; Image features are described by n-bit binary vectors:

$$f_n(p) := \sum_{1 \leq i \leq n} 2^{i-1} \tau(p; x_i, y_i);$$

The ORB algorithm has the characteristic of invariant rotation, using the main direction of key feature points to rotate the BRIEF descriptor; The specific process is as follows:

1) For any feature point in the image, n pairs of pixel values located $(x_i, y_i)$ within the S×S neighborhood may be represented by a 2×n matrix:

$$S = \begin{pmatrix} x_1, \ldots, x_n \\ y_1, \ldots, y_n \end{pmatrix} \tag{13}$$

2) The main direction θ of the feature points obtained using FAST: Using the neighborhood circle of corner point P as an image block B, define the moment of image block B as:

$$m_{pq} = \sum_{x,y \in B} x^p y^q I(x, y), \quad p, q = \{0, 1\} \tag{14}$$

The centroid of the image block B can be found through equation (14):

$$C = \left( \frac{m_{10}}{m_{00}}, \frac{m_{01}}{m_{00}} \right),$$

connect the geometric center O of the image block with the centroid C to obtain a direction vector $\overrightarrow{OC}$. At this point, the direction of the feature points may be defined as: θ=arctan $(m_{01}/m_{10})$ 3) Calculate the corresponding rotation matrix $R_\theta$ and S: From the direction of the feature points calculated in Step 2), it can be seen that:

$$R_\theta = \begin{bmatrix} \cos\theta & -\sin\theta \\ \cos\theta & \cos\theta \end{bmatrix},$$

Therefore, $S_\theta = R_\theta S$.

4) Calculate the rotation descriptor:

$$g_n(p, \theta) := f_n(p) | (x_i, y_i) \in S_\theta \tag{15}$$

In Equation (15), $$f_n(p) := \sum_{1 \leq i \leq n} 2^{i-1} \tau(p; x_i, y_j),$$

is the descriptor of BRIEF. Thus, the rotation invariance of the ORB algorithm can be achieved.

Feature Point Matching

Calculate the Hamming distance between feature descriptors in the image alignment, which means calculating the similarity between feature points. If it is less than the given threshold, the two feature points will be matched.

Another object of the present invention is to provide an inland vessel identification and ranging system applying the said method for identifying and ranging inland vessels, wherein the inland vessel identification and ranging system comprises:

Visual ranging model building module, used to build a binocular stereo vision ranging model;

Camera calibration model building module, used to build a camera calibration model based on the principle of pinhole imaging;

MobilenetV1-YOLOv4 vessel identification model building module, used to connect the three different scale feature layers extracted by the MobileNetv1 with the SPP and PANet modules of the traditional YOLOv4 model, and build a Mobilenetv1-YOLOv4 target detection model;

Vessel feature point detection and matching module, used to extract feature points using the FAST algorithm, create binary descriptors for the detected key feature points using BRIEF, and then perform feature point matching.

Another object of the present invention is to provide a computer device that includes a memory and a processor, wherein the memory stores a computer program that, when executed by a processor, causes the said processor to perform the steps of the said method for identifying and ranging inland vessels.

Another object of the present invention is to provide a computer-readable storage medium containing a computer program that, when executed by a processor, causes the said processor to perform the steps of the said method for identifying and ranging inland vessels.

Another object of the present invention is to provide an information data processing terminal which is used to implement the said inland vessel identification and ranging system.

Based on the above technical solution and the technical problems solved, please analyze the advantages and positive effects of the technical solution to be protected by the present invention from the following aspects:

Firstly, in response to the technical problems existing in the existing technology mentioned above and the difficulty of solving them, a detailed and profound analysis of how the technical solution of the present invention solves the technical problems is conducted in close combination with the technical solution to be protected, the results and data during the research and development process, and some creative technical effects brought about by solving the problems. The details are described as follows:

The present invention applies binocular stereo vision technology to the identification and ranging of inland vessels, which is mainly divided into two stages: vessel identification and ranging. In the stage of vessel target identification, based on the classic YOLO-V4 network model and considering the computation pressure brought by the large network parameters of the model, a lightweight network is proposed to complete the identification task. The MobileNetV1 network is used to replace the feature extraction network CSPLocknet53 of the YOLO-V4 model, which greatly reduces the computational workload while ensuring identification accuracy. In the stage of vessel target ranging, a binocular stereo vision ranging model is first established, and then the FSRCNN is used for super-resolution reconstruction of the original image pairs to enhance the vessel feature information. Then, the ORB algorithm is used to achieve feature detection and matching at the sub-pixel level to obtain the parallax value between image pairs. Finally, the depth information of the vessel target is obtained through triangulation principle and coordinate conversion.

In order to improve the navigation safety of inland vessels and enrich its environmental perception methods, the present invention conducts relevant analysis on inland vessel identification and ranging using binocular stereo vision. In the stage of vessel identification, considering the calculation pressure brought by the huge network parameters of the classic YOLOv4 model, the present invention proposes to use MobileNetV1 network as the feature extraction module of YOLO-V4 model. The results show that the mAP value of MobileNetV1-YOLO-V4 model reaches 89.25%, and the weight of the backbone network network is only 47.6M, which greatly reduces the computational workload while ensuring the identification accuracy. In the stage of vessel ranging, the present invention proposes a sub-pixel level feature point detection and matching algorithm based on the ORB algorithm. Firstly, the FSRCNN algorithm is used to perform super-resolution reconstruction on the original image, which further increases the density and detection accuracy of the image feature points, thereby facilitating the calculation of image parallax values. The results show that when the distance from the target is about 300 m, the ranging error is below 3%, which has high ranging accuracy and can meet the ranging needs of inland vessels.

The binocular stereo vision ranging technology proposed by the present invention can range the vessels at different distances. When the laser rangefinder is used as the standard, there is a certain error in the distance calculated by this technology. When the target distance is around 300 m, the error is below ±2%, and when the target distance is greater than 300 m, the error increases because as the target distance increases, the difficulty of detecting and matching the feature points will further increase, which affects the calculation result of parallax, thus causing the error to show an increasing trend to a certain extent, but overall, the error is below ±3%. During the navigation of inland vessels, a distance of about 300 m is sufficient for vessels to make corresponding decisions. Therefore, this technology can meet the ranging needs of inland vessels and has important research significance for the development of future intelligent vessels.

Secondly, considering the technical solution as a whole or from the perspective of the product, the effects and advantages of the technical solution to be protected by the present invention are described as follows:

The binocular stereo vision ranging technology provided by the present invention compensates for the shortcomings of existing environmental perception methods, improves the navigation safety of vessels to a certain extent, and greatly promotes the development of future intelligent vessels. The binocular stereo vision technology proposed by the present invention further enriches the perception methods of vessels towards the navigation environment, improves the navigation safety of inland vessels, and has important research significance for the development of future intelligent vessels.

Thirdly, as creative supporting evidence for the claims of the present invention, it is also reflected in the following important aspects:

(1) The Technical Solution of the Present Invention Fills the Technical Gap in the Industry at Home and Abroad:

The key to safe navigation of a vessel lies in the effective perception of the surrounding navigation environment and the ability of the pilot to make timely and effective decisions. However, at present, the main methods of environmental perception are AIS and radar, both of which have certain drawbacks. The present invention applies the binocular stereo vision technology to the complex environment of inland rivers, and it partially compensates for the shortcomings of AIS and radar by equipping vessels with "eyes" to intelligently perceive the navigation environment. This technology does not require transmitting signals to target objects in the navigation environment. It collects the contour, shape and texture information of the target through visual information, and uses these feature information to restore the depth information of the target, providing assistance for vessel decision-making. This technology has obvious advantages and good application prospects compared to other sensors.

(2) Whether the Technical Solution of the Present Invention Solves the Technical Difficulties that People have been Eager to Solve, but have Never been Successful:

At present, intelligent vessels are the main development trend in the shipping industry. By installing various onboard sensors, the navigation environment can be effectively sensed, thereby improving the navigation safety of vessels. However, current technology is unable to effectively identify and measure long-range targets, such obstacles as other ships, reefs and glaciers, as well as navigation aids, which partly affects the navigation safety of vessels. Based on this, the present invention applies the binocular stereo vision technology to the identification and ranging of inland vessels. Experiments have shown that in the complex environment of inland rivers, this technology can effectively identify various target vessels and accurately measure the distance information between the vessel and the target ship. It has high accuracy in vessel target identification and ranging, and has a certain degree of real-time performance, meeting the requirements of timely and effective decision-making for inland vessels in sudden situations.

(3) Whether the Technical Solution of the Present Invention Overcomes Technical Biases:

With the continuous development of computer vision, the binocular stereo vision technology is gradually maturing, but it is mainly applied in small scenes, such as mechanical arms in industry, medical fields, and robot grasping, which is relatively difficult to apply in complex inland environments. For this purpose, the present invention builds a binocular device based on an industrial gun camera to expand the field of view by increasing the baseline distance. At the same time, in order to increase the density of target feature points, it proposes a sub-pixel level feature point detection and matching method, which further improves the accuracy of disparity calculation and thereby improves the distance measurement accuracy of the target. In addition, this technology takes into account the real-time nature of engineering applications and builds a more lightweight target identification model, which further improves identification efficiency while ensuring identification accuracy.

DESCRIPTION OF THE DRAWINGS

In order to provide a clearer explanation of the technical solution of the embodiments of the present invention, a brief description will be given to the accompanying drawings required in the embodiments. It is evident that the accompanying drawings described below are only some embodiments of the present invention. For ordinary technical personnel in the art, other accompanying drawings can be obtained based on these drawings without any creative effort.

FIG. 12A shows the vessel image, and FIG. 12B shows the Labeling process;

DETAILED DESCRIPTION OF THE EMBODIMENTS

In order to make the purpose, technical solution and advantages of the present invention more clearly understood, the following will provide a further detailed explanation of the present invention in conjunction with embodiments. It should be understood that the specific embodiments described here are only intended to explain the present invention and are not intended to limit it.

In response to the problems existing in the existing technology, the present invention provides a method, system, medium, equipment and terminal for identifying and ranging inland vessels. The following is a detailed description of the present invention in conjunction with the accompanying drawings.

I. Explain the embodiments. In order to enable those skilled in the art to fully understand how the present invention is specifically implemented, this section provides an explanation and implementation example of the claimed technical solution.

Figure 1:
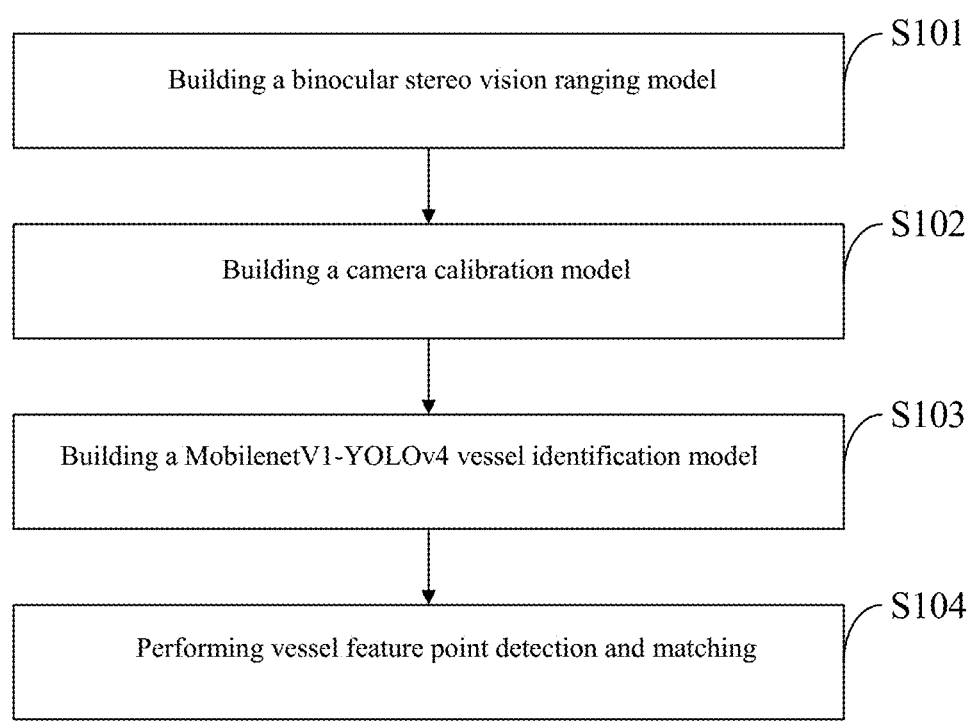
FIG. 1 is a flowchart of the inland vessel identification and ranging method provided by the embodiment of the present invention.

As shown in FIG. 1, the inland vessel identification and ranging method provided by the embodiment of the present invention includes the following steps:

S101: Building a binocular stereo vision ranging model;
S102: Building a camera calibration model;
S103: Building a MobilenetV1-YOLOv4 vessel identification model;
S104: Performing vessel feature point detection and matching.

As a preferred embodiment, the inland vessel identification and ranging method provided by the embodiment of the present invention specifically includes:

1. Binocular Stereo Vision Ranging Model

Figure 2:
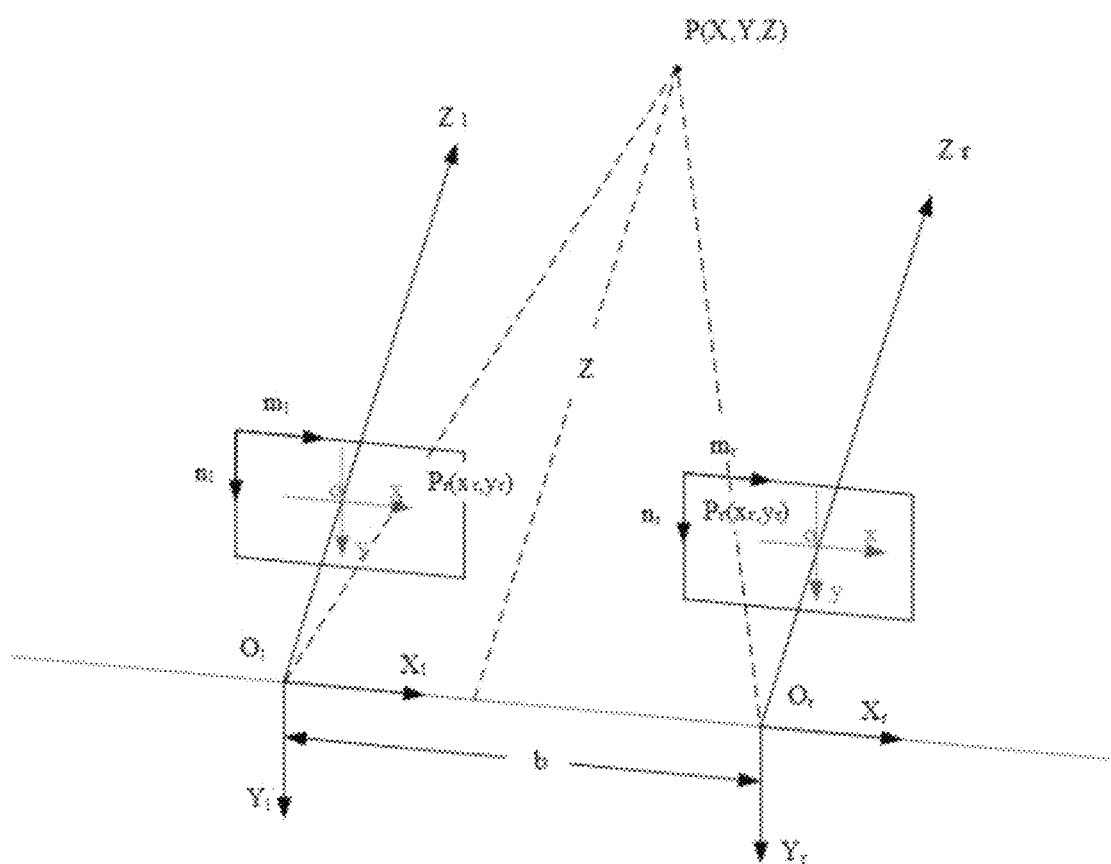
FIG. 2 is a schematic diagram of the binocular stereo vision 3D positioning model provided by the embodiment of the present invention.

Binocular stereo vision ranging technology perceives the depth of the surrounding environment through anthropomorphic methods and acquires 3D information about the target in the real world. According to the triangulation principle, two parallel and co-planar cameras are used to capture and image the same scene from different angles, and the depth information is recovered by calculating the parallax value between the image pairs. As shown in FIG. 2, the optical center positions of the left and right cameras are $O_l$ and $O_r$, respectively, and $O_l X_l Y_l Z_l$ and $O_r X_r Y_r Z_r$ are the coordinate systems of the left and right cameras; b is the horizontal distance between the optical center $O_l$ and $O_r$, known as the baseline distance; The focal length of the camera is f; For the 3D space point P(X,Y,Z) the projection point coordinates in the imaging coordinate system of the left and right cameras are $p(x_l, y_l)$ and $p(x_r, y_r)$, respectively.

Figure 3:
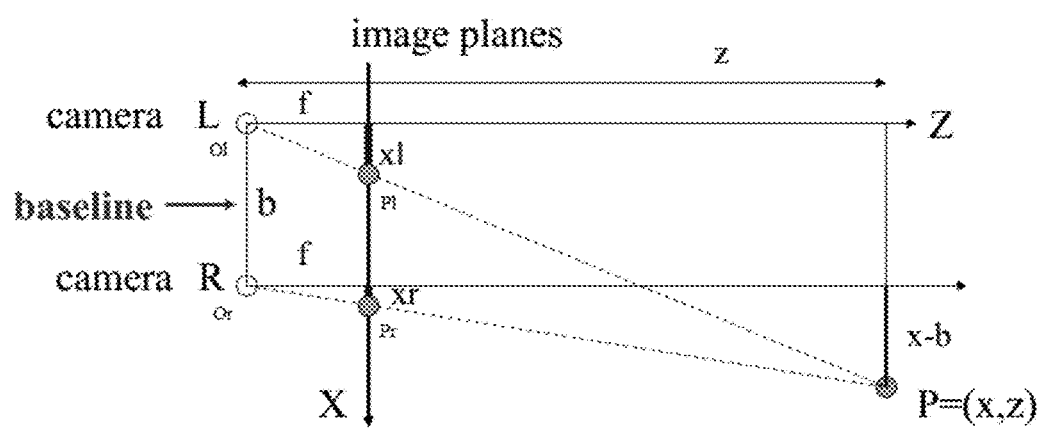
FIG. 3 is a schematic diagram of the XOZ projection surface of the binocular stereo vision model provided by the embodiment of the present invention.

Project the above 3D model onto the XOZ plane, as shown in FIG. 3.

According to the principle of triangle similarity, it can be concluded that:

$$\begin{cases} \dfrac{z}{f} = \dfrac{x}{x_l} \\ \dfrac{z}{f} = \dfrac{x-b}{x_r} \\ \dfrac{z}{f} = \dfrac{y}{y_l} = \dfrac{y}{y_r} \end{cases} \quad (1)$$

The calculation leads to:

$$\begin{cases} z = \dfrac{f*b}{x_l - x_r} = \dfrac{f*b}{d} \\ x = \dfrac{x_l * z}{f} \\ f = \dfrac{y_l * z}{f} \text{ or } f = \dfrac{y_r * z}{f} \end{cases} \quad (2)$$

In Equation (2), $x_l - x_r$ is called parallax d, which represents the offset of point P from the corresponding projection point on the left and right cameras; z is the depth value of point P; According to Equation (2), when parameters f and b are determined, the depth z of the target point can be obtained just by calculating the difference between the coordinates x or y of the target point in the pixel coordinate system of the left and right cameras.

Therefore, in order to obtain the depth information of target point P, it is necessary to calculate the projection point coordinates $p_l(x_l, y_l)$ and $p_r(x_r, y_r)$ of the point on the left and right camera imaging planes. By converting between coordinate systems, the 3D information of the point can be obtained.

2. Camera Calibration Model

Figure 4:
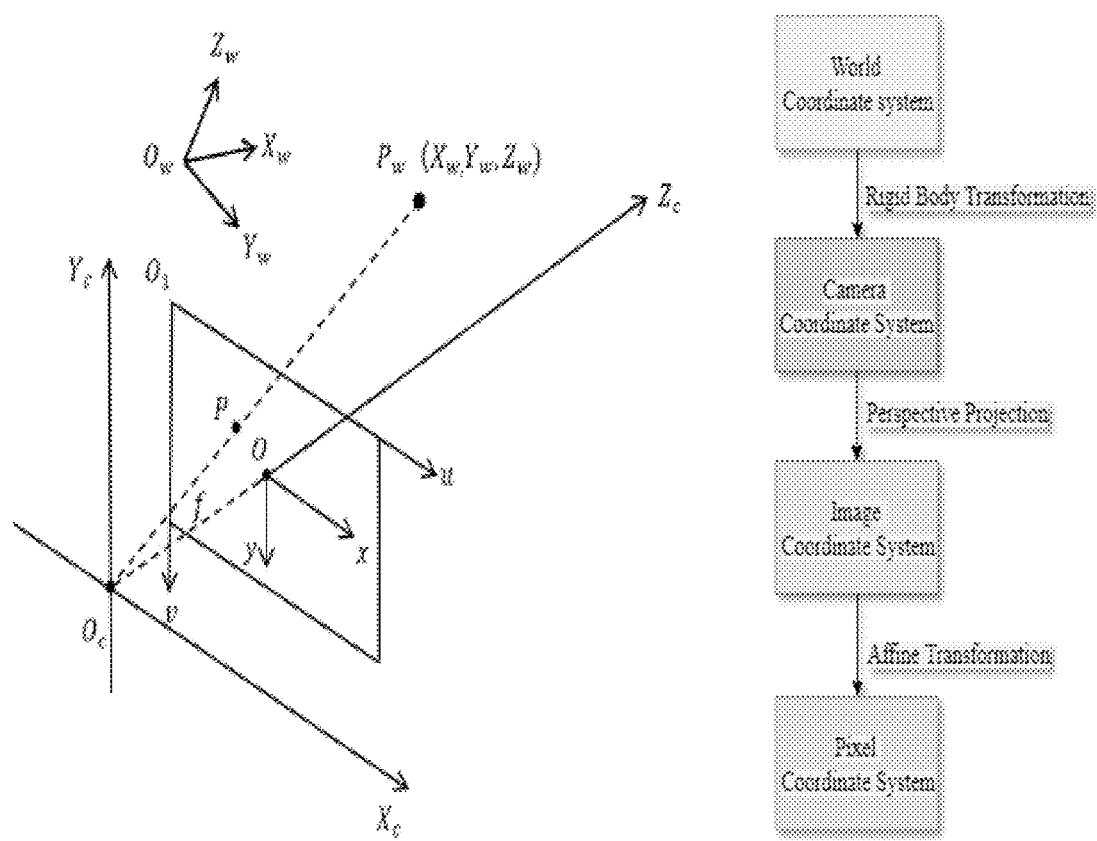
FIG. 4 is a schematic diagram of the camera imaging model provided by the embodiment of the present invention.

In the binocular stereo vision ranging technology, the camera imaging geometric modeling must be established to obtain the 3D information of the target point, that is, the camera's internal and external parameters. The process of solving the parameters is called camera calibration, and the accuracy and stability of the calibration results will also have a certain impact on the ranging results. A pinhole camera model is used for the imaging process of the camera, and its principle is shown in FIG. 4. In reality, when a camera is used for photography, the light reflected by an object is projected onto the imaging plane through the camera lens, demonstrating that points in 3D space are projected onto a two-dimensional image through coordinate transformation. This process mainly involves transformations between four coordinate systems: world coordinate system, camera coordinate system, image coordinate system, and pixel coordinate system.

According to the principle of pinhole imaging, in FIG. 4, assuming that a point $P_w(X_w, Y_w, Z_w)$ is located in the 3D world coordinate system, the projection coordinate of the point in the camera coordinate system is $P_c(X_c, Y_c, Z_c)$, the coordinate in the image coordinate system is P(x,y), the coordinates P(u,v), and $O_c$ in the pixel coordinate system are the camera optical center position, and $O_c Z_c$ is the camera optical axis. The mathematical expression between $P_w(X_w, Y_w, Z_w)$ and pixel coordinate P(u,v) is:

$$Z_c \begin{pmatrix} u \\ v \\ 1 \end{pmatrix} = \begin{pmatrix} \dfrac{1}{dx} & 0 & u_0 \\ 0 & \dfrac{1}{dy} & v_0 \\ 0 & 0 & 1 \end{pmatrix} \begin{pmatrix} f & 0 & 0 & 0 \\ 0 & f & 0 & 0 \\ 0 & f & 0 & 0 \end{pmatrix} \begin{pmatrix} R & T \\ \vec{0} & 1 \end{pmatrix} \begin{pmatrix} X_w \\ Y_w \\ Z_w \\ 1 \end{pmatrix} = \quad (3)$$

$$\begin{pmatrix} f_x & 0 & u_0 & 0 \\ 0 & f_y & v_0 & 0 \\ 0 & 0 & 1 & 0 \end{pmatrix} \begin{pmatrix} R & T \\ \vec{0} & 1 \end{pmatrix} \begin{pmatrix} X_w \\ Y_w \\ Z_w \\ 1 \end{pmatrix}$$

Let $$K = \begin{pmatrix} f_x & 0 & u_0 & 0 \\ 0 & f_y & v_0 & 0 \\ 0 & 0 & 1 & 0 \end{pmatrix},$$

referred to as the internal parameter matrix of the camera, then the above equation can be simplified as:

$$Z_c \begin{pmatrix} u \\ v \\ 1 \end{pmatrix} = K \begin{pmatrix} R & T \\ \vec{0} & 1 \end{pmatrix} \begin{pmatrix} X_w \\ Y_w \\ Z_w \\ 1 \end{pmatrix} \quad (4)$$

In Equations (3) to (4), $$f_x = \dfrac{f}{d_x}, f_y = \dfrac{f}{d_y}, d_x \text{ and } d_Y$$

respectively represent the physical dimensions of each pixel in the x and y directions of the image plane, $u_0$ and $v_0$ represent the coordinates of the image center point, R represents the rotation matrix, and T represents the translation vector, which constitute the external parameter matrix $$\begin{pmatrix} R & T \\ \vec{0} & 1 \end{pmatrix}$$

of the camera, and the external parameter matrix and internal parameter matrix of the camera can be obtained by the camera calibration.

3. MobilenetV1-YOLOv4 Vessel Identification Model

3.1 YOLOv4 Network

Figure 5:
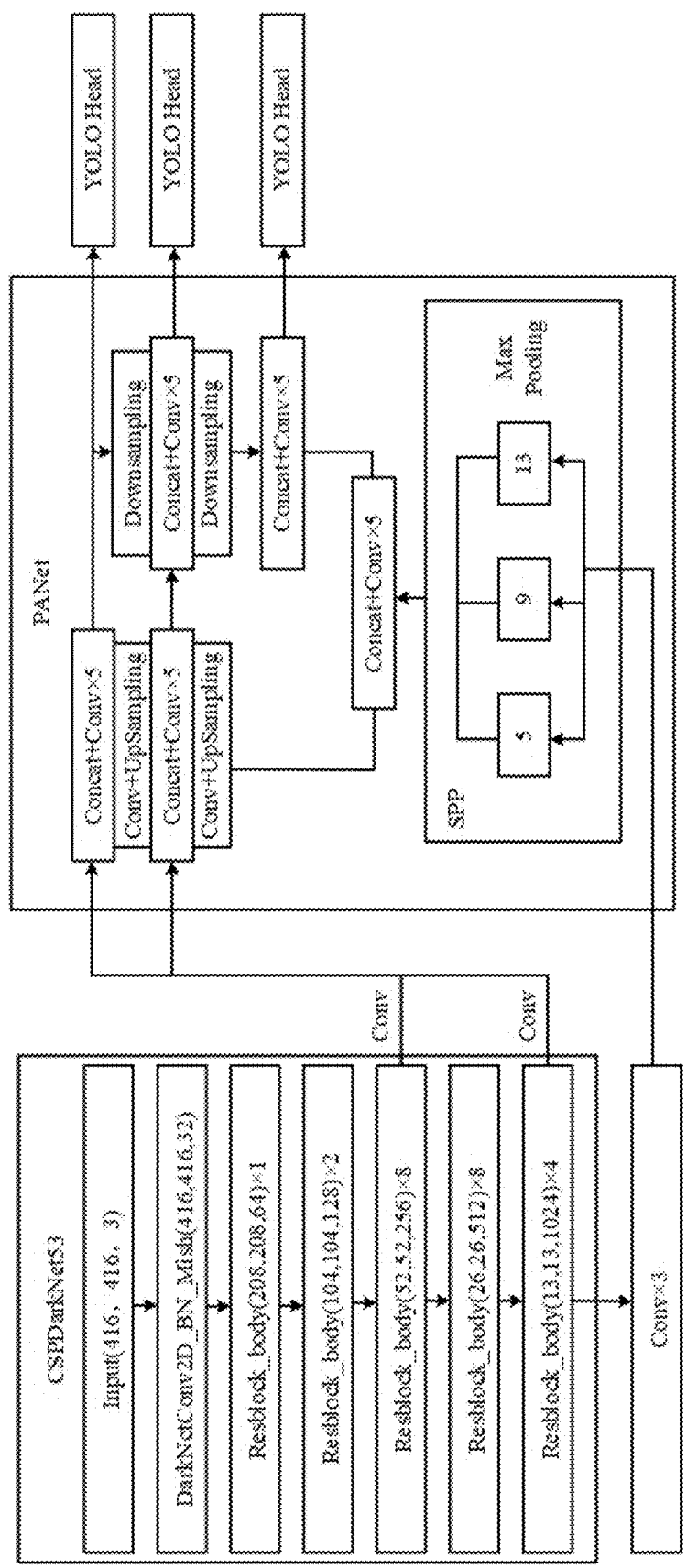
FIG. 5 is a schematic diagram of the YOLOv4 network structure provided by the embodiment of the present invention.

YOLO (you only look once) is a one-stage object detection algorithm proposed by Redmon et al. in 2016. This algorithm transforms the classification problem of traditional object detection into a regression problem, and uses a convolutional neural network to directly predict the position and probability of the target from the input image, achieving end-to-end object detection algorithms. The present invention builds a vessel target identification model based on the YOLOv4 model, with a network structure mainly composed of Backbone, Neck and Head, as shown in FIG. 5.

The YOLOv4 network uses CSPDarknet53 as the backbone network for feature extraction, and combines Cross Stage Partial (CSP) and residual network to effectively solve the problem of gradient information duplication in the Darknet53 network, and can extract higher-level feature information. While reducing model parameters, it further enhances the feature extraction ability of the Backbone network. The Neck module is mainly composed of a spatial pyramid pooling (SPP) and a path aggregation network (PANet). The SPP uses three pooling layers of different scales: 5×5, 9×9 and 13×13 After the input features are pooled to the maximum, the range of the receptive field can be greatly increased, thus eliminating the impact of different scales of the input image, and producing a fixed length output. The PANet network serves as a feature fusion module, which adds a bottom-up path on top of the Feature Pyramid Network (FPN) to improve the model's ability to extract features at different levels. Finally, the Head module is used to detect the target and output three feature maps of different sizes: 13×13, 26×26 and 52×52.

3.2 MobileNetv1

Figure 6:
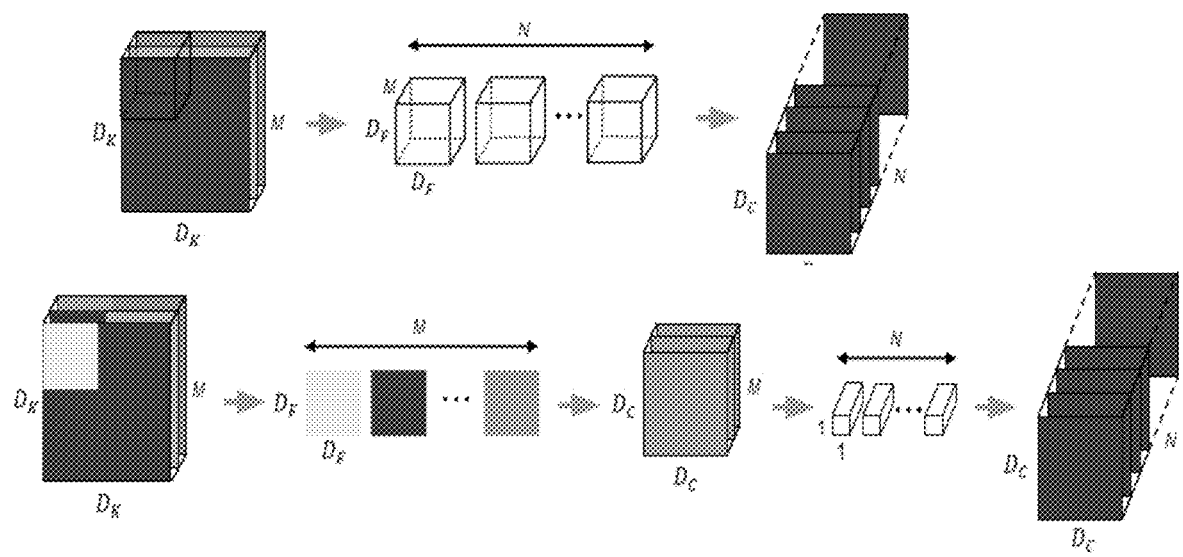
FIG. 6 is a schematic diagram of standard convolution and depth-wise separable convolution provided by the embodiment of the present invention.

MobileNet is an efficient lightweight network specifically designed for mobile and embedded devices. It is based on the depth-wise separable convolution method, which decomposes standard convolutions into depth convolutions and point convolutions with a kernel size of 1×1. Depth convolution convolves each channel of the input image, while point convolution is used to combine channel convolution outputs. This convolution method can effectively decrease computational workload and reduce the size of the model. The effect of standard convolution and depth-wise separable convolution is shown in FIG. 6.

If the size of the input image is $D_K \times D_K$, the input channel is M, the number of convolutional kernels is N, and the convolutional kernel size is $D_F \times D_F$, then the output feature map size is $D_C \times D_C$, and the output channel is N In traditional convolutional operations, the number of parameters that need to be calculated is:

$$\text{Params1} = D_F \times D_F \times M \times N \tag{5}$$

The calculation of the parameters for depth-wise separable convolution is divided into two parts: one is the depth convolution parameter, and the other is the point convolution parameter, where the size of the point convolution kernel is 1×1. Therefore, the number of parameters that need to be calculated is:

$$\text{Params2}D = D_F \times D_F \times M + M \times N \tag{6}$$

The ratio of parameters between depth-wise separable convolution and standard convolution methods is:

$$\frac{Params2}{Params1} = \frac{D_F \times D_F \times M + M \times N}{D_F \times D_F \times M \times N} = \frac{1}{N} + \frac{1}{D_F^2} \tag{7}$$

Figure 7:
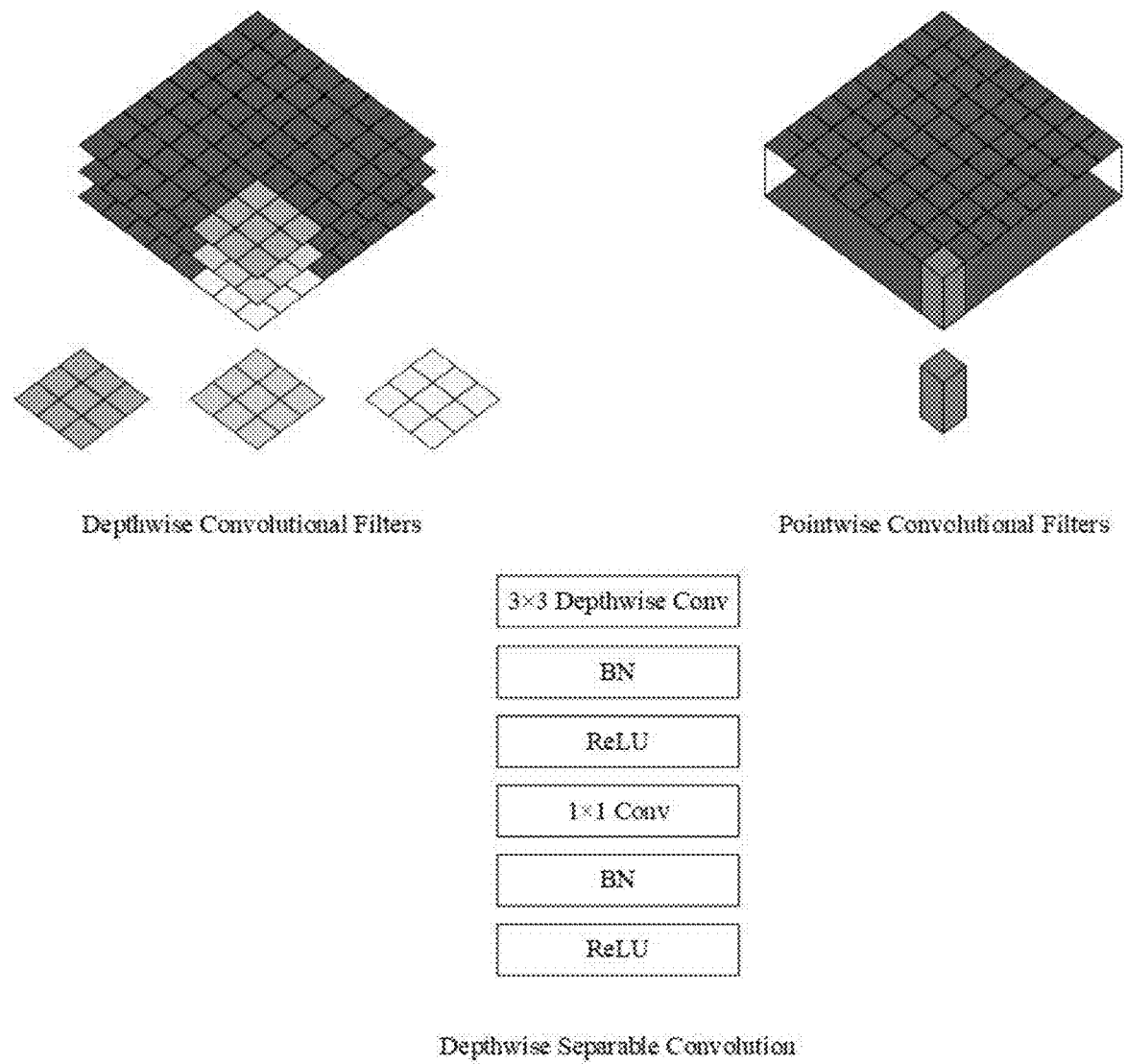
FIG. 7 is a schematic diagram of a depth-wise separable convolution module provided by the embodiment of the present invention.

It can be seen from Equation (7) that by setting different sizes of convolutional kernel, the number of parameters of the network can be reduced to some extent. The MobileNetv1 is based on a depth-wise separable convolution module, as shown in FIG. 7, which uses a 3×3 convolution kernel to perform depth convolution and extract feature information. A BN layer and a ReLU layer are connected between depth convolution and point convolution, and feature information is output through a BN layer and a ReLU layer after point convolution; The number of parameters is relatively reduced by 8 to 9 times, but the convolution effect is comparable to standard convolution. The MobileNetv1 has a total of 28 layers. The first layer is a standard 3×3 convolution, with 13 depth-wise separable convolution modules built. Before the fully connected layer, an average pooling layer is used to reduce the spatial resolution to 1, and the softmax layer is used to output probability for each category to be identified.

3.3 Mobilenetv1-YOLOv4 Structure

Figure 8:
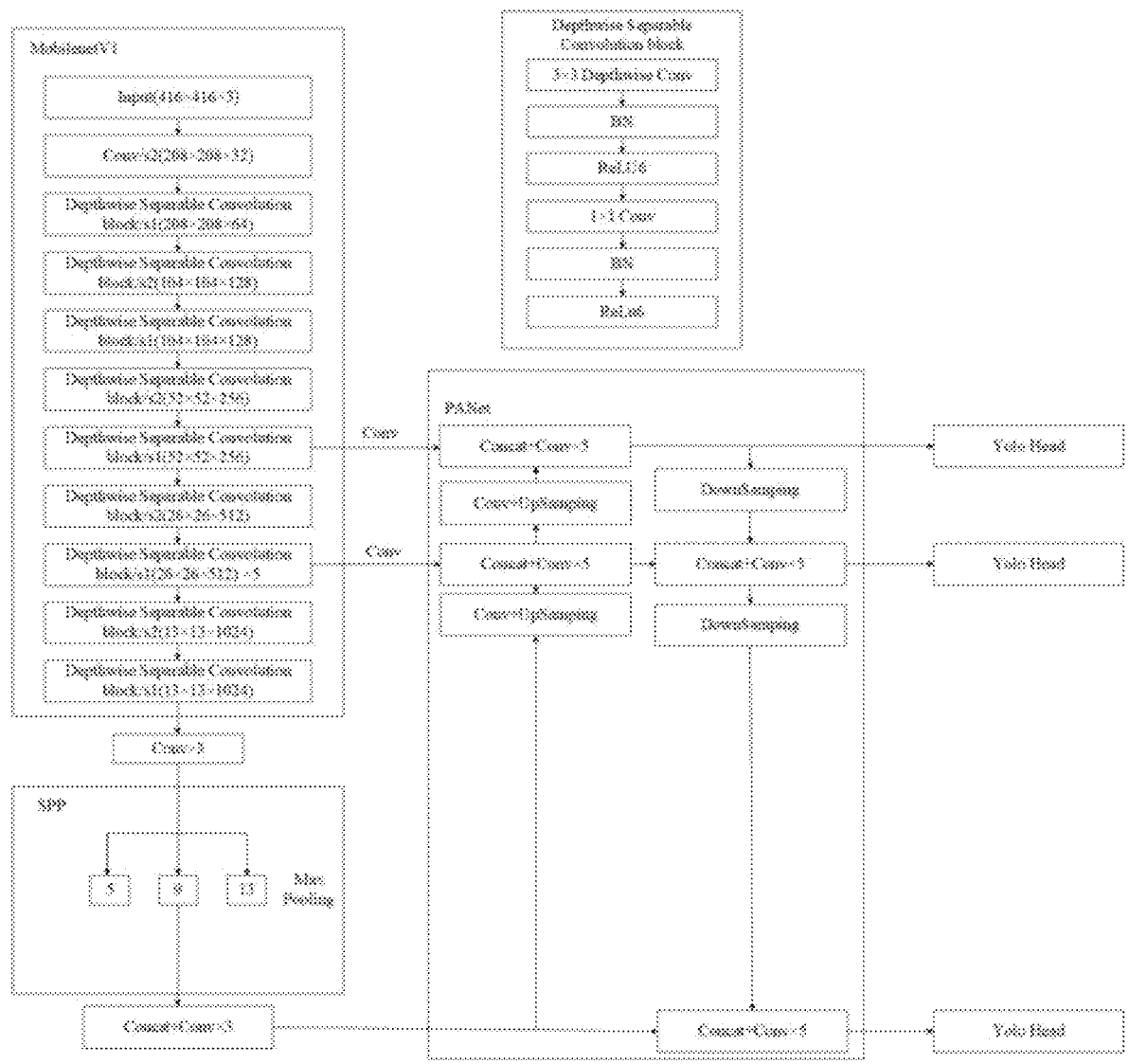
FIG. 8 is a schematic diagram of the Mobilenetv1-YOLOv4 structure provided by the embodiment of the present invention.

Considering that the traditional YOLOv4 network structure is too large and the number of parameters calculated is also very large, which makes the trained network model have a large scale and is not suitable for target detection on devices with insufficient computing power and memory, the present invention replaces the backbone network Dark net53 of YOLOv4 with MobileNetv1, that is, the three different scale feature layers extracted by MobileNetv1 are connected with the SPP and PANet modules of the traditional YOLOv4 model, to build a Mobilenetv1-YOLOv4 target detection model, which greatly reduces the number of parameters and computational complexity of the model. The network structure of Mobilenetv1-YOLOv4 is shown in FIG. 8.

4. Vessel Feature Point Detection and Matching 4.1 FSRCNN

Figure 9:
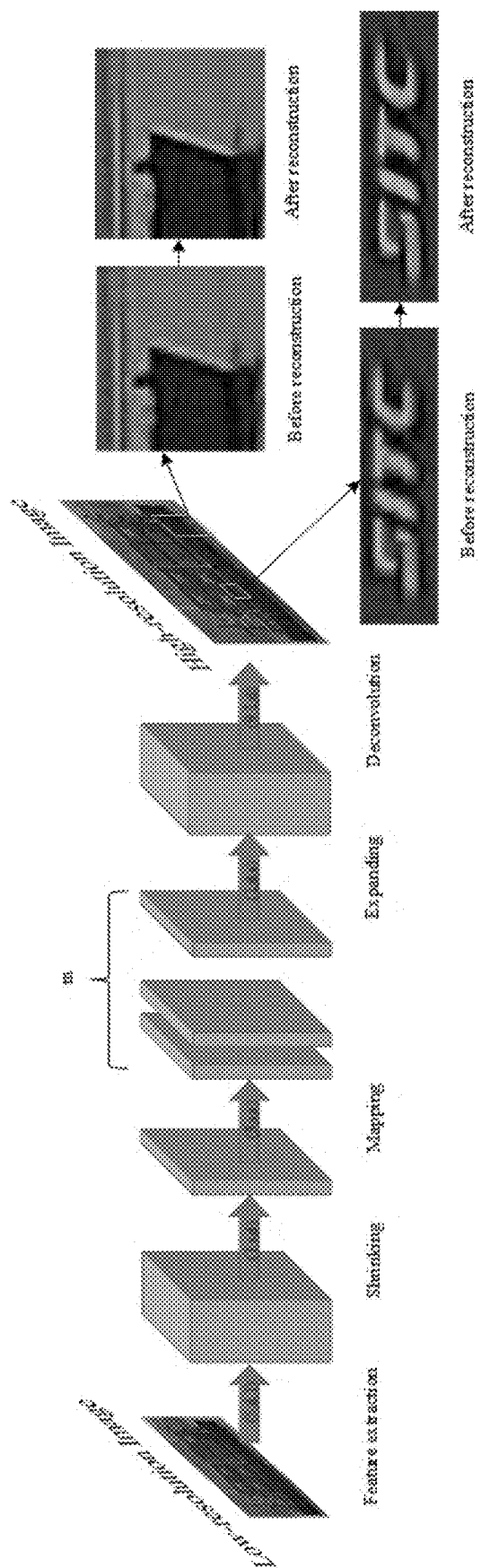
FIG. 9 is a flowchart of the FSRCNN model provided by the embodiment of the present invention.

The FSRCNN model consists of five parts: feature extraction, reduction, mapping, amplification and deconvolution. The first four parts are convolutional layers, and the last part is deconvolution layers. The specific operation process of this network is shown in FIG. 9.

The FSRCNN directly takes the original low resolution image as the input, and uses the parameter rectified linear unit (PReLU) as the activation function, as shown in Equation (8). The FSRCNN uses d 5×5 sized convolutional kernel for feature extraction, s 1×1 sized convolutional kernel for shrinkage, m 3×3 sized convolutions concatenated as mapping layers, and d 1×1 sized convolutional kernels for expansion. At the end of the network, one 9×9 sized convolutional kernel is used for deconvolution to obtain high-resolution images.

$$f(x_i) = \begin{cases} x_i, & x_i > 0 \\ a_i x_i, & x_i \leq 0 \end{cases} \tag{8}$$

The mean square error is used as the loss function during FSRCNN training, as shown in Equation (9):

$$\text{loss} = \min_\theta \frac{1}{n} \sum_{i=1}^{n} \left\| F(Y_s^i; \theta) - X^i \right\|_2^2 \tag{9}$$

Where, $Y_s^i$ and $X^i$ are the i-th pair of super-resolution images and low-resolution images in the training data, respectively. $F(Y_s^i; \theta)$ is the network output, $\theta$ is the hyper-parameter in the network.

4.2 ORB Algorithm

The ORB (Oriented Fast and Rotated BRIEF) algorithm can be used to quickly create feature vectors for key feature points in an image, thereby identifying corresponding targets in the image. It features fast detection speed, and it is basically not constrained by noise points and image rotation transformation. The algorithm is mainly divided into three steps:

(1) Feature Point Extraction

Figure 10:
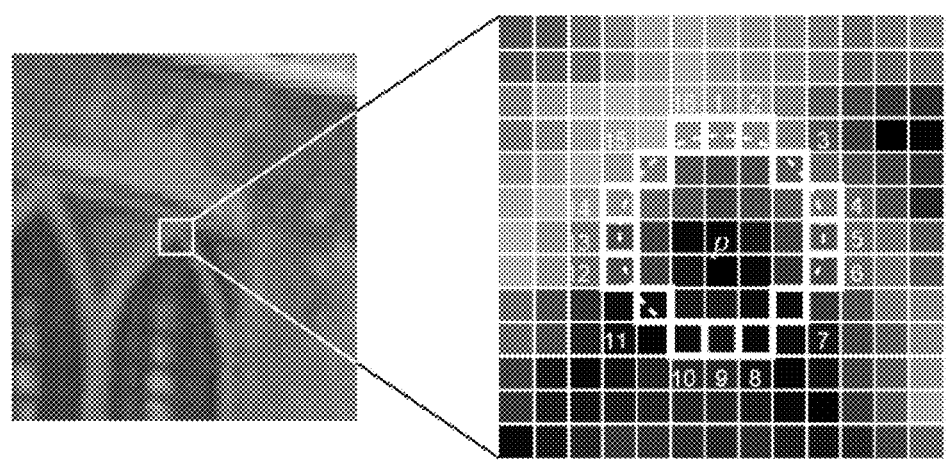
FIG. 10 is a schematic diagram of FAST feature point detection provided by the embodiment of the present invention.

The ORB algorithm first uses the FAST (Features From Accelerated Segment Test) algorithm to find prominent feature points in the image. The main idea is that if a pixel in the image differs significantly from enough pixels in its surrounding neighborhood, that pixel may be a feature point. The specific steps of the algorithm are as follows:

1) Select a pixel point P in the image to be detected, as shown in FIG. 10. The pixel value of this pixel point is $I_P$, and then a circle is determined with P as the center and a radius of 3. At this point, there are 16 pixels on the determined circle, represented as $P_1, P_2, \ldots, P_{16}$, respectively.
2) Determine a threshold: t.
3) Calculate the difference between all pixel values on the determined circle and the pixel values of P. If there are consecutive N points that satisfy Equation (10), where $I_x$ represents a point where 16 pixels on the circle are located, then that point can be considered as a candidate point. Based on experience, generally let N=12. Usually, in order to reduce the computation and accelerate the efficiency of feature point search, pixel numbers 1, 9, 5, and 13 are detected for each pixel. If at least three of these four points meet Equation (10), then that point is a candidate detection point.

$$\begin{cases} I_x - I_p > t \\ I_x - I_p \leq -t \end{cases} \quad (10)$$

After candidate point detection, multiple feature points are usually detected, and these feature points are likely to be adjacent to each other. To solve this problem, maximum suppression can be used to remove excess candidate points.

(2) BRIEF Descriptor Creation

The ORB algorithm uses BRIEF (Binary Robust Independent Element Features) to create binary descriptors for the detected key feature points, which describe feature vectors that only contain 0 and 1, thereby accelerating the establishment of feature descriptors. The specific steps are as follows:

1) In order to further reduce the sensitivity of feature points to noise, the image to be detected is first processed by Gaussian filter.
2) BRIEF takes the candidate feature point P as the center point, takes a S×S sized area, randomly selects two points $P_x$ and $P_y$ within the area, compares the pixel sizes of the two points, and assigns the following values:

$$\tau(p; x, y) := \begin{cases} 1, & p(x) < p(y) \\ 0, & p(x) \geq p(y) \end{cases} \quad (11)$$

In Equation (11), $P_x$ and $P_y$ are the pixel values of random points $x(u_1,v_1)$ and $y(u_2,v_2)$ in the area, respectively.

3) Randomly select n pixel pairs in the area of S×S and repeat binary assignment in Equation (12). The encoding process is the description of the feature points in the image, which is the feature descriptor. The value of n is usually 128, 258 or 512. At this point, image features can be described by n bit binary vectors, namely:

$$f_n(p) := \sum_{1 \leq i \leq n} 2^{i-1} \tau(p; x_i, y_i) \quad (12)$$

The ORB algorithm has the characteristic of invariant rotation, using the main direction of key feature points to rotate the BRIEF descriptor. The specific process is as follows:

1) For any feature point in the image, n pairs of pixel values located $(x_i, y_i)$ within the S×S neighborhood may be represented by a 2×n matrix:

$$S = \begin{pmatrix} x_1, \ldots, x_n \\ y_1, \ldots, y_n \end{pmatrix} \quad (13)$$

2) The main direction θ of the feature points obtained using FAST: Using the neighborhood circle of corner point p as an image block B, define the moment of image block B as:

$$m_{pq} = \sum_{x,y \in B} x^p y^q I(x, y), \, p, q = \{0, 1\} \quad (14)$$

The centroid of the image block B can be found through equation (14):

$$C = \left( \frac{m_{10}}{m_{00}}, \frac{m_{01}}{m_{00}} \right),$$

connect the geometric center O of the image block with the centroid C to obtain a direction vector $\overrightarrow{OC}$. At this point, the direction of the feature points may be defined as: θ=arctan $(m_{01}, m_{10})$.

3) Calculate the corresponding rotation matrix $R_\theta$ and S:

From the direction of the feature points calculated in Step 2), it can be seen that:

$$R_\theta = \begin{bmatrix} \cos\theta & -\sin\theta \\ \cos\theta & \cos\theta \end{bmatrix},$$

Therefore, $S_\theta = R_\theta S$.

4) Calculate the rotation descriptor:

$$g_n(p, \theta) := f_n(p) | (x_i, y_i) \in S_\theta \quad (15)$$

In Equation (15), $$f_n(p) := \sum_{1 \leq i < n} 2^{i-1} \tau(p; x_i, y_i),$$

is the descriptor of BRIEF. Thus, the rotation invariance of the ORB algorithm can be achieved.

Feature Point Matching

Calculate the Hamming distance between feature descriptors in the image alignment, which is the similarity between feature points. If it is less than the given threshold, the two feature points will be matched.

5. Conclusions

With the continuous deepening of economic globalization, waterway transportation has gradually become one of the most important modes of transportation in international trade. The number, types, and new routes of ships are constantly increasing, which may present a thriving atmosphere in the shipping industry. However, it can also cause congestion and increased load on shipping routes, thereby affecting the navigation safety of vessels and seriously threatening the lives and property safety of personnel on the vessels. According to the investigation and analysis of shipping accidents, human error is the main cause of maritime and inland river accidents. The key to navigation safety of vessels lies in the perception of the surrounding navigation environment and the effective use of various perceptual information for correct analysis and decision-making. As a commonly used means of navigation environment perception, AIS has certain drawbacks in receiving and sending ship information, and constrains ship maneuvering behavior, which has a certain degree of impact on the navigation safety of vessels.

The present invention addresses the shortcomings of existing environmental perception methods during the navigation of inland vessels, and applies the binocular stereo vision technology to the identification and ranging of inland vessels, which is mainly divided into two stages: vessel identification and ranging. In the stage of vessel target identification, based on the classic YOLO-V4 network model and considering the computation pressure brought by the large network parameters of the model, a lightweight network is proposed to complete the identification task, that is, the MobileNetV1 network replaces the feature extraction network CSPMarket53 of the YOLO-V4 model. The results show that the mAP value of MobileNetV1-YOLO-V4 model reaches 89.25%, and the weight of the backbone network is only 20% of the classic YOLOv4 network, which greatly reduces the computational workload while ensuring identification accuracy. In the stage of vessel ranging, the present invention proposes a sub-pixel level feature point detection and matching algorithm, which is based on the ORB algorithm and uses FSRCNN to perform super-resolution reconstruction of image pairs, further enhancing vessel feature information and facilitating the calculation of image parallax values. The ranging experiments of inland vessels have shown that when the distance from the target is about 300 m, the ranging error is below 3%, indicating a high ranging accuracy. The binocular stereo vision technology proposed by the present invention further enriches the perception methods of vessels towards the navigation environment, improves the navigation safety of inland vessels, and has important research significance for the development of future intelligent vessels.

The inland vessel identification and ranging system provided by the embodiment of the present invention includes:
Visual ranging model building module, used to build a binocular stereo vision ranging model;
Camera calibration model building module, used to build a camera calibration model based on the principle of pinhole imaging;
MobilenetV1-YOLOv4 vessel identification model building module, used to connect the three different scale feature layers extracted by the MobileNetv1 with the SPP and PANet modules of the traditional YOLOv4 model, and build a Mobilenetv1-YOLOv4 target detection model;
Vessel feature point detection and matching module, used to extract feature points using the FAST algorithm, create binary descriptors for the detected key feature points using BRIEF, and then perform feature point matching.

II. Apply the embodiments. In order to demonstrate the creativity and technical value of the technical solution of the present invention, this section is an application example of the claimed technical solution on specific products or related technologies.

Binocular stereo vision technology, as a non-contact target identification and measurement method with high accuracy, fast speed and easy operation, has been widely applied in fields such as national defense, aviation surveying and mapping, biomedicine, robot navigation, and industrial detection.

In the field of visual navigation, it is applied to unmanned vehicle driving, mobile robot navigation, and unmanned aerial vehicles; In the field of industrial product testing, applying image and visual technology to production automation can accelerate production speed, ensure consistency in product quality, and also avoid errors caused by fatigue and lack of concentration among workers; In the field of biomedicine, this technology is mainly used to assist doctors in medical image analysis. In addition, it can also be used for biological and chemical analysis, such as automatic classification of blood cell counts, chromosome analysis, cancer cell identification, etc. In fields such as aviation, aerospace, weapons, and surveying, this technology can reduce training damage and improve work efficiency. At the same time, 3D systems have been established on weapons and equipment, such as autonomous navigation vehicles, which can improve the survival ability of soldiers on the battlefield, and this technology plays an important role in the battlefield; In the field of virtual reality, this technology includes 3D computer graphics, wide-angle stereoscopic display technology, scene modeling, battlefield environment simulation, etc.

III. Evidence of the effects related to the embodiments. The embodiments of the present invention have achieved some positive effects in the research and development or use process, and indeed have significant advantages compared to existing technologies. The following content is described in combination with data, charts, and other experimental processes.

Experimental Results and Analysis

1. Experimental Environment and Equipment

The experiment was conducted using a Windows 10 system, with a processor of i7-11800H 2.30 GHz and a GPU of NVIDIA GeForce RTX3060Ti. The experimental software used Matlab2021b, pycharm2018.3.7, Tensor Flow deep learning framework, and OpenCV computer vision library. Matlab2021b is mainly used to calibrate binocular cameras and obtain corresponding internal and external parameter matrices. Pycharm2018.3.7, Tensor Flow, and OpenCV are used for target identification, feature point detection and matching, and ranging tasks.

The experimental site of the present invention is located in Nananzui Jiangtan Park, Wuhan City, Hubei Province. The Huaxia Industrial Gun Camera was used to collect data from inland vessels, and the camera parameters are shown in Table 1. Horizontal rotation and pitch angle adjustment can be achieved through the bottom pan head of the camera, and the horizontal distance between binocular cameras can be adjusted within the range of [0.3, 1.5] (unit: meters).

TABLE 1

| Camera parameters | |
| --- | --- |
| Parts | Parameter value |
| Sensor type | 1/2.8"Progressive Scan CMOS |
| Electronic shutter | 1/25-1/100000 seconds |
| Automatic iris | DC drive |
| Focal length | 5.5-180 mm, 33x optical zoom |
| Iris | F1.5-F4.0 |
| Horizontal field of view angle | 2.3°-60.5° |
| Video compression standard | H.265/H.264/MJPEG |
| Main stream resolution | 50 HZ; 25 fps (1920 × 1080, 1280 × 960, 1280 × 720) |
| Interface type | Network card interface |

2. Camera calibration analysis

Camera calibration is the fundamental work of binocular stereo vision ranging technology, and the accuracy of calibration results is closely related to the ranging effect. During the equipment construction process, the structural parameters and environmental factors of the camera have a certain impact on the calibration results. In the experiment, the horizontal distance between the cameras was set to 50 cm and kept horizontal with the river surface. In order to increase experimental flexibility and operability, Zhang Zhengyou calibration method was used in the present invention for camera calibration experiments, which is integrated into the Stereo Camera Calibration toolbox of MATLAB and combined with the internal parameter model and distortion model proposed by Heikkil and Silver. The calibration results have high accuracy and are currently a commonly used camera calibration method.

In the experiment, a 16×9 black and white checkerboard calibration board was first made, with each grid size of 60 mm. A binocular camera was used to shoot the calibration board from different angles. In the experiment, 30 sets of calibration board images were taken, and after screening, 18 sets of data were selected for camera calibration. The calibration results are shown in Table 2.

TABLE 2

| Camera calibration results | | |
| --- | --- | --- |
| Parameter type | Left eye camera | Right eye camera |
| Internal parameter matrix | $\begin{pmatrix} 1292 & 0 & 611 \\ 0 & 1294 & 375 \\ 0 & 0 & 1 \end{pmatrix}$ | $\begin{pmatrix} 1286 & 0 & 643 \\ 0 & 1289 & 368 \\ 0 & 0 & 1 \end{pmatrix}$ |
| External parameter matrix | $\begin{pmatrix} 1 & 0.0161 & -0.0033 \\ -0.0161 & 1 & 0.0109 \\ 0.0033 & -0.0109 & 1 \end{pmatrix}$ | T = [−498 3.949 −2.898] |
| Distortion coefficient | [−0.299 0.164 0 0 0] | [−0.281 0.079 0 0 0] |

Figure 11:
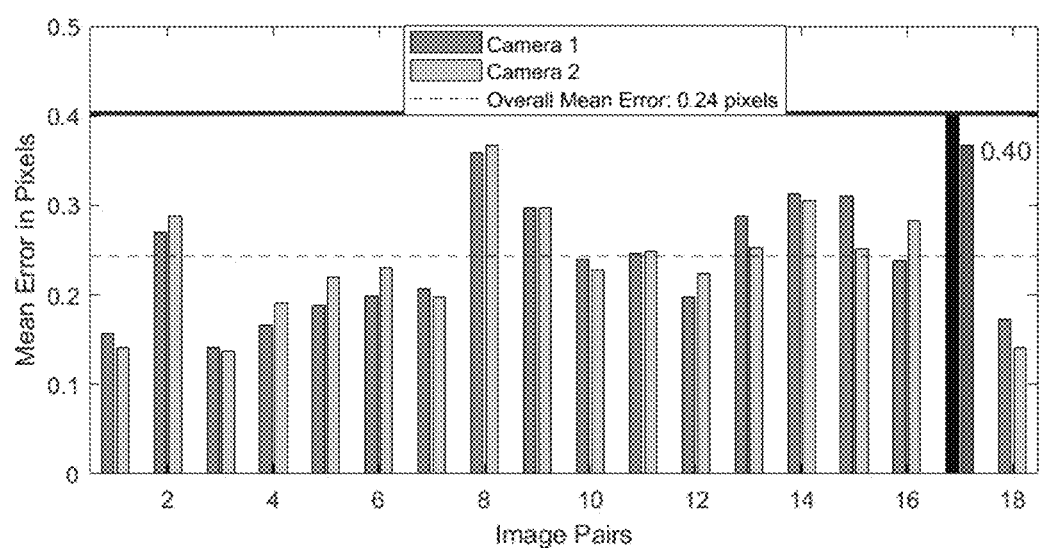
FIG. 11 is a schematic diagram of the reprojection error for camera calibration provided in the embodiment of the present invention.

In Table 2, it can be seen from the internal parameter matrix that the camera focal length is approximately the same, and the rotation matrix is similar to the identity matrix, indicating that the two cameras are basically parallel. The reprojection error of the camera is shown in FIG. 11. It can be seen that the maximum calibration error is 0.40 pixels, and the average error is 0.24 pixels, both of which are less than 1 pixel. This meets the standard for experimental use. The obtained calibration parameters can be used to perform stereo correction on the left and right eye images.

3. Analysis of Vessel Target Identification 3.1 Data Collection and Annotation

Figure 12A:
FIG. 12A and FIG. 12B are schematic diagrams of vessel image data and annotation provided by the embodiment of the present invention.
Figure 12B:
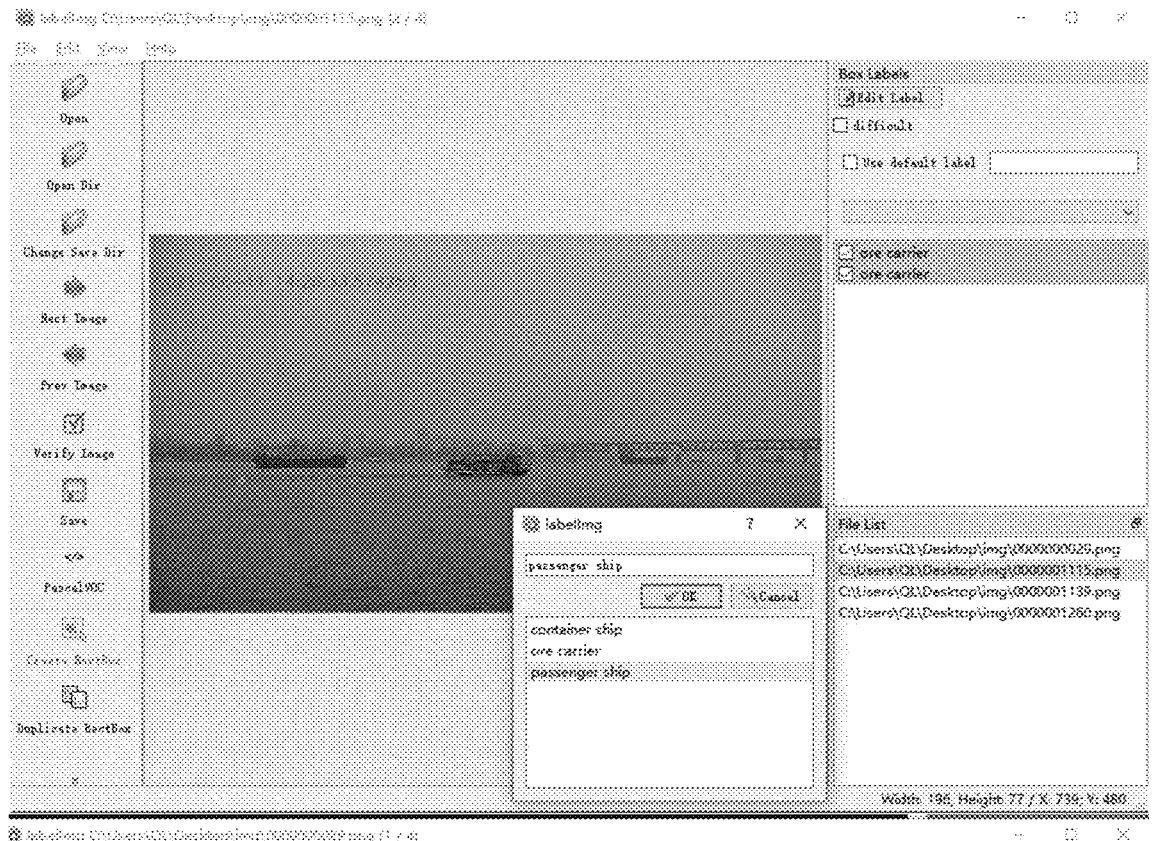
Figure 12B:
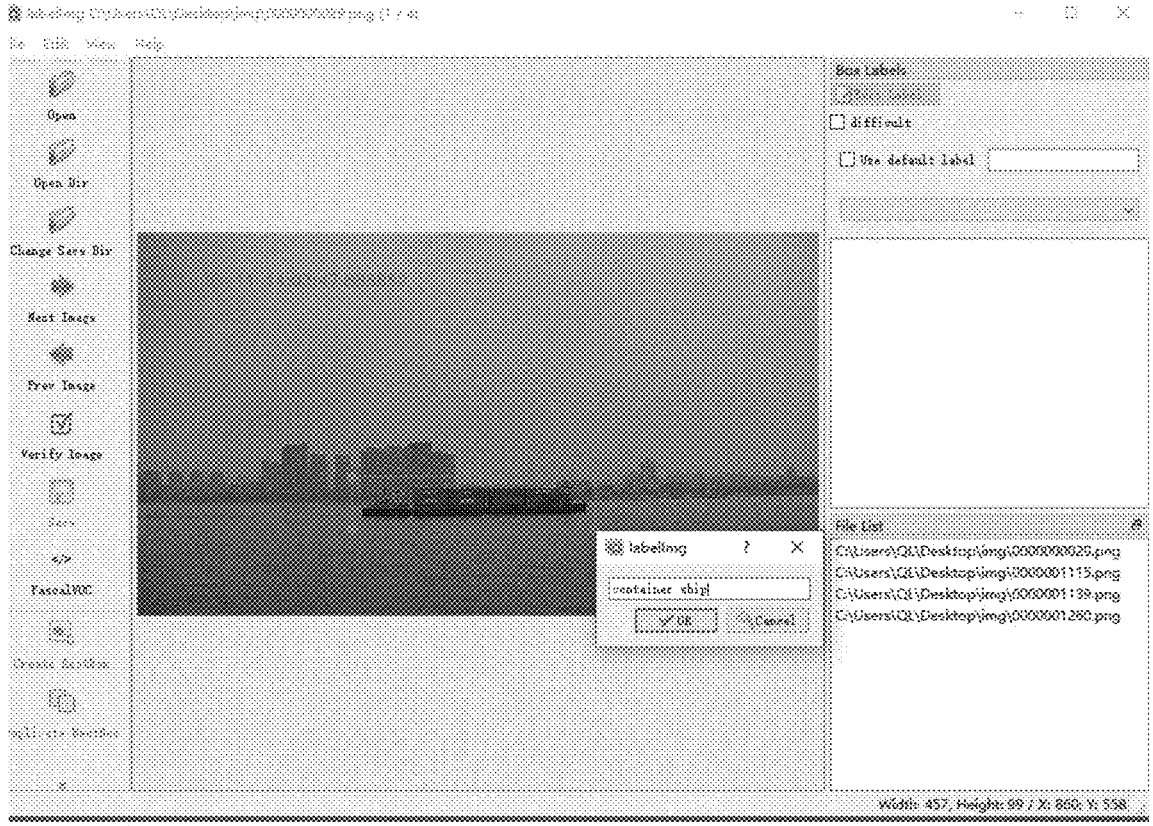

In the experiment, a binocular stereo camera was used to collect a total of 2000 images of inland vessels, with a resolution of 1280×720, consisting of three types of vessels: container ship, passenger ship and ore carrier. Before inputting vessel image data into the Mobilev1-Yolov4 network, certain annotation operations need to be performed on the image. The present invention uses the Labeling tool to annotate vessel targets, and the annotation results include the position information of the vessel target bound, namely the coordinate value and category information of the target. Part of the vessel image data and annotation process are shown in FIG. 12.

3.2 Evaluation Indicators

The evaluation indicators for target detection in deep learning are the basis for measuring the quality of detection results. The experiment of this present invention comprehensively considers the precision, recall and category evaluation accuracy mAP (mean Average Precision) of detection results. The mathematical expressions for Precision, Recall and mAP are shown in Equations (16) to (18):

$$\text{Precision} = \frac{TP}{TP+FP} \quad (16)$$

$$\text{Recall} = \frac{TP}{TP+FP} \quad (17)$$

$$mAP = \frac{1}{\text{classes}} \sum_{i=1}^{\text{classes}} \int_0^1 P(R)d(R) \quad (18)$$

Where, TP (True positives) represents the number of positive samples correctly detected as positive samples; FN (False negatives) represents the number of positive samples detected as negative samples; FP (False positives) represents the number of negative samples detected as positive samples, while mAP represents the mean area under the Precision-reacll curve of multiple samples, which is used as a measure of detection accuracy in object detection.

3.3 ANALYSIS of Vessel Target Identification

In the target identification stage, the K-means algorithm is first used to obtain vessel target candidate bounds. Each scale generates three candidate bounds of different sizes, resulting in 9 candidate bounds. The size of each candidate bound is shown in Table 3.

TABLE 3

| Size of each candidate bound | | |
| --- | --- | --- |
| (17, 6) | (18, 8) | (19, 12) |
| (28, 10) | (29, 14) | (51, 9) |
| (44, 16) | (71, 19) | (118, 27) |

Figure 13:
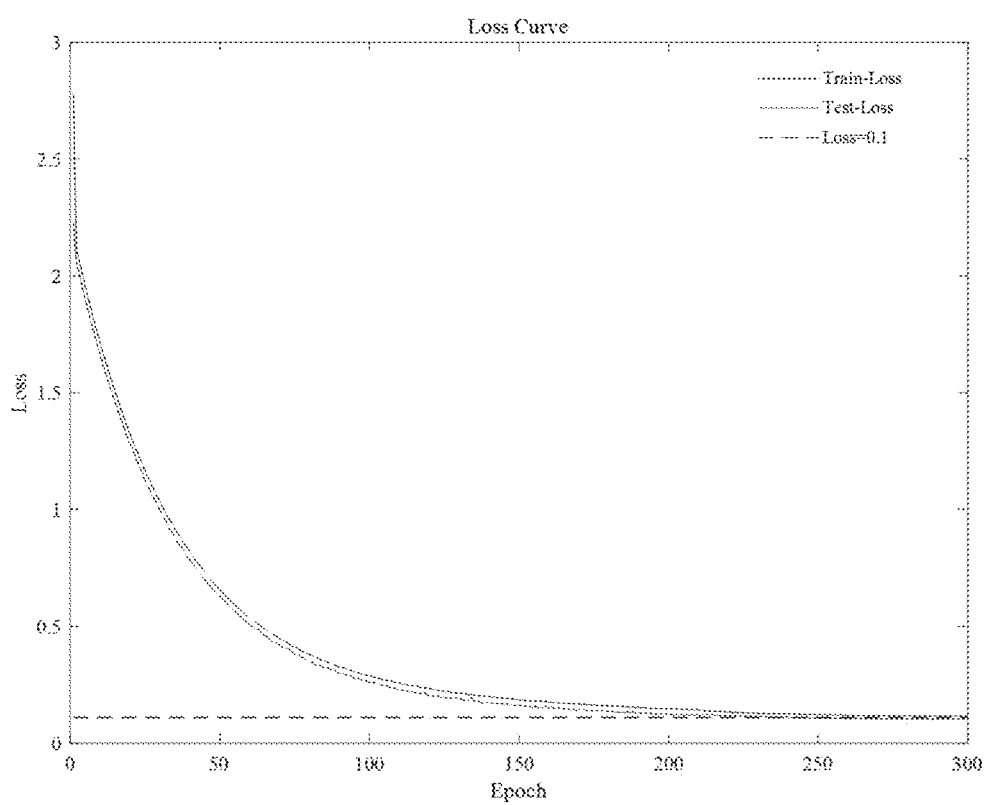
FIG. 13 is the Mobilev1-yolov4 network Loss curve provided by the embodiment of the present invention.

In the target identification stage, the present invention comprehensively considers the diversity of the captured target scene and uses Mosaic data augmentation method to randomly crop and concatenate the collected vessel images from multiple angles, further enriching the data samples. In the experiment, the dataset was randomly divided into a training set and a testing set in a 9:1 ratio. To verify the effectiveness of the improved YOLOv4 algorithm, a comparative experiment was conducted using the classic YOLOv4 algorithm. The key network parameters were set as follows: learning_rate=0.001, batch_size=4, optimizer= SGD, and epoch=300. The loss curve of Mobilev1-yolov4 network training is shown in FIG. 13. It can be seen that after 300 network training sessions, the loss value continuously decreases and eventually converges to 0.1, resulting in a better training model.

Figure 14:
FIG. 14 is a graph of the effect of vessel identification in the Mobilev1-yolov4 network provided by the embodiment of the present invention.

Input the test set data into the trained model, and the model identification effect is shown in FIG. 14. It can be seen that the Mobilv1-yolov4 model can accurately identify different types of vessel targets with high precision.

In the quantitative evaluation stage of network performance, both were conducted on the Python platform in order to better compare the advantages and disadvantages of the two models, and the key parameters of the models were set to: learning_rate=0.001, optimizer=SGD, achieving 300 iterations for network training. Six indicators, namely Precision, Recall, mAP, FPS and Backbone weights, were used for evaluation and analysis. The experimental comparison results of the classic Yolov4 model and Mobilv1-yolov4 model are shown in Table 4.

ranging effect. In response to these issues, the present invention proposes an area-based sub-pixel feature point matching method. Firstly, the vessel target boundary box output from the mobilev1-yolov4 network is used to extract the vessel area. Then, the FSRCNN is used to enhance the super-resolution of the vessel area, further increasing the number of feature points. Finally, the ORB algorithm is used for vessel feature point detection and matching.

Figure 15:
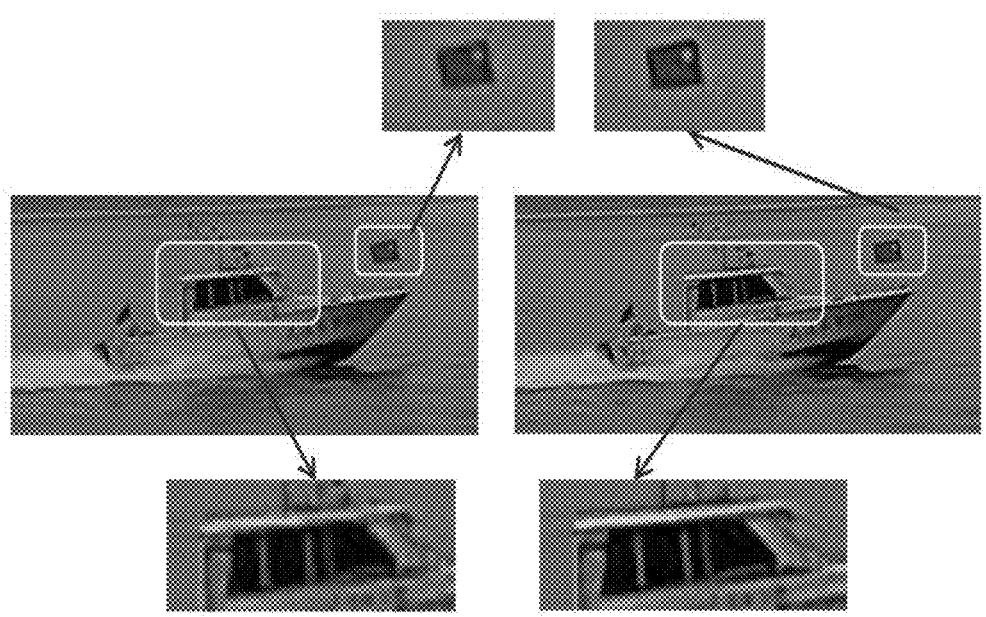
FIG. 15 is a schematic diagram of the reconstruction effect of the FSRCNN provided by the embodiment of the present invention.

The present invention uses the universal dataset ImageNet-91 to train the FSRCNN, and the self-made image dataset Set14 is used as the test set. During the training process of the FSRCNN, learning_rate=$10^{-5}$, optimizer is Adam, epoch=60K. The effect of FSRCNN reconstruction is shown in FIG. 15. It can be seen that the vessel image, after super-resolution reconstruction, enhances the edge feature information in the image, which makes the image clearer and achieves the effect of denoising to a certain extent.

Experimental comparison between classis Yolov4 model and Mobilv1-yolov4 model

| Model | classes | Input_size | Score_threshold | Precision/% | Recall/% | mAP/% | Backbone_weights/M | FPS |
|---|---|---|---|---|---|---|---|---|
| Yolov4 | Ore carrier | | | 91.32 | 86.21 | | | |
| | Container ship | 416 × 416 | 0.5 | 100.00 | 100.00 | 90.70 | 244 | 26.11 |
| | Passenger ship | | | 87.10 | 75.00 | | | |
| Mobilev1-yolov4 | Ore carrier | | | 87.95 | 84.91 | | | |
| | Container ship | 416 × 416 | 0.5 | 100.00 | 100.00 | 89.25 | 47.6 | 66.23 |
| | Passenger ship | | | 89.29 | 69.44 | | | |

Table 4 shows the comparative experimental results of the two models, and it indicates that they exhibit different advantages and disadvantages under different indicators. Under the same input dimension, the Yolov4 model and Mobilev1-yolov4 model show strong advantages in identifying three types of vessels. For container ships, both Precision and Recall indicators reach 100%. In contrast, the identification performance of ore carrier and passenger ships is slightly lower because there are more container ships in the captured scene, which is more conducive to model training. There are fewer ore carrier and passenger ships, which affects the identification performance to some extent. Overall, both have mAP values of around 90%. For the weight index of the backbone network, the weight of the Mobilev1-yolov4 model is only about 20% of that of the Yolov4 model, which greatly alleviates the computing and memory pressure of the computer, and the FPS of the Mobilev1-yolov4 model has reached 66.23, while the Yolov4 model is only 26.11. It can be seen that replacing the feature extraction module of the classic Yolov4 network with Mobilev1 network greatly reduces network parameters, improves computational speed, and has high real-time performance while ensuring high identification accuracy.

4. Analysis of Vessel Ranging 4.1 ANALYSIS of Vessel Feature Point Detection and Matching In practice, due to factors such as environment and camera, when using the matching algorithm based on gray scale correlation, the feature points in the image are sparse, which makes it difficult to detect and identify the feature points, obtain accurate image matching results and not easy to calculate the parallax value, which in turn affects the In order to further quantify the performance of the FSRCNN, Peak Signal to Noise Ratio (PSNR) was used for evaluation and compared with the ESPCN method. The experimental results of some images in the test set are shown in Table 5. According to Table 5, if the PSNR of the reconstructed image using FSRCNN method is higher, it indicates that the better the image quality, the smaller the distortion; For images of different sizes, the reconstruction time of both methods is equivalent, and overall, both methods have shorter reconstruction times.

TABLE 5

Effect of image reconstruction in test set

| Test_pic | Picture_size | Model | PSNR/dB | Reconstruction time/s |
|---|---|---|---|---|
| Test_pic1 | 456 × 72 | FSRCNN | 35.945062 | 0.045590 |
| | | ESPCN | 34.582875 | 0.027407 |
| Test_pic2 | 381 × 74 | FSRCNN | 35.562458 | 0.018695 |
| | | ESPCN | 36.029904 | 0.016069 |
| Test_pic3 | 193 × 43 | FSRCNN | 35.875411 | 0.006879 |
| | | ESPCN | 35.246397 | 0.007040 |
| Test_pic4 | 426 × 72 | FSRCNN | 38.673282 | 0.019900 |
| | | ESPCN | 38.022336 | 0.016829 |
| Test_pic5 | 540 × 70 | FSRCNN | 38.444051 | 0.027066 |
| | | ESPCN | 37.565404 | 0.029988 |
| Test_pic6 | 88 × 211 | FSRCNN | 36.462584 | 0.017341 |
| | | ESPCN | 34.900440 | 0.012008 |

Figure 16:
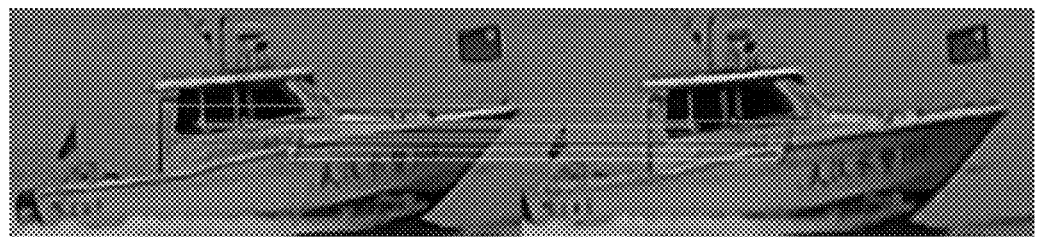
FIG. 16 is a schematic diagram of feature point matching in left and right eye images provided by the embodiment of the present invention.

The ORB algorithm is used for feature point extraction and matching of vessel images after super-resolution reconstruction. The algorithm constructs an image pyramid for down-sampling feature extraction, and detects feature points for each down-sampling image based on the FAST algorithm. The extraction and matching results of vessel feature points are shown in FIG. 16, indicating that the ORB algorithm can achieve good feature point matching results. The matching pair contains a large amount of edge and contour information of the image, with a more uniform distribution, which is more conducive to the calculation of disparity.

4.2 Analysis of Vessel Ranging

Figure 17:
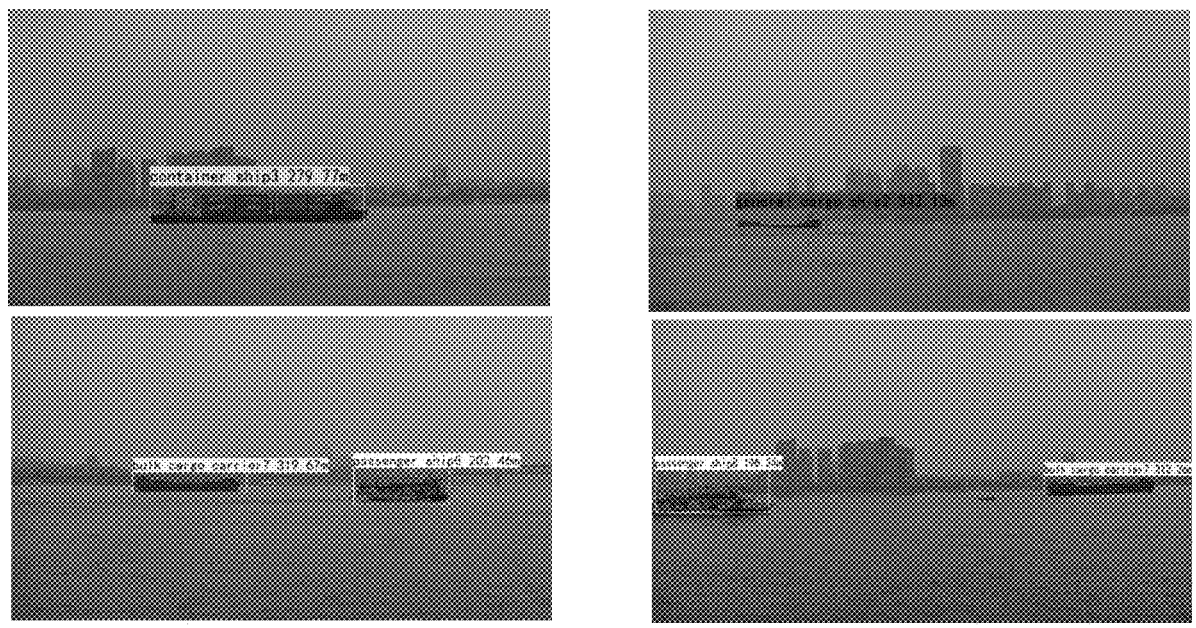
FIG. 17 is a schematic diagram of the binocular ranging effect provided by the embodiment of the present invention.

In the experiment, the ORB algorithm was used to detect multiple feature points and obtain more disparity values. The present invention uses the average disparity value of all feature points of a single target to calculate the depth of the target. The effect of vessel target ranging is shown in FIG. 17.

Figure 18:
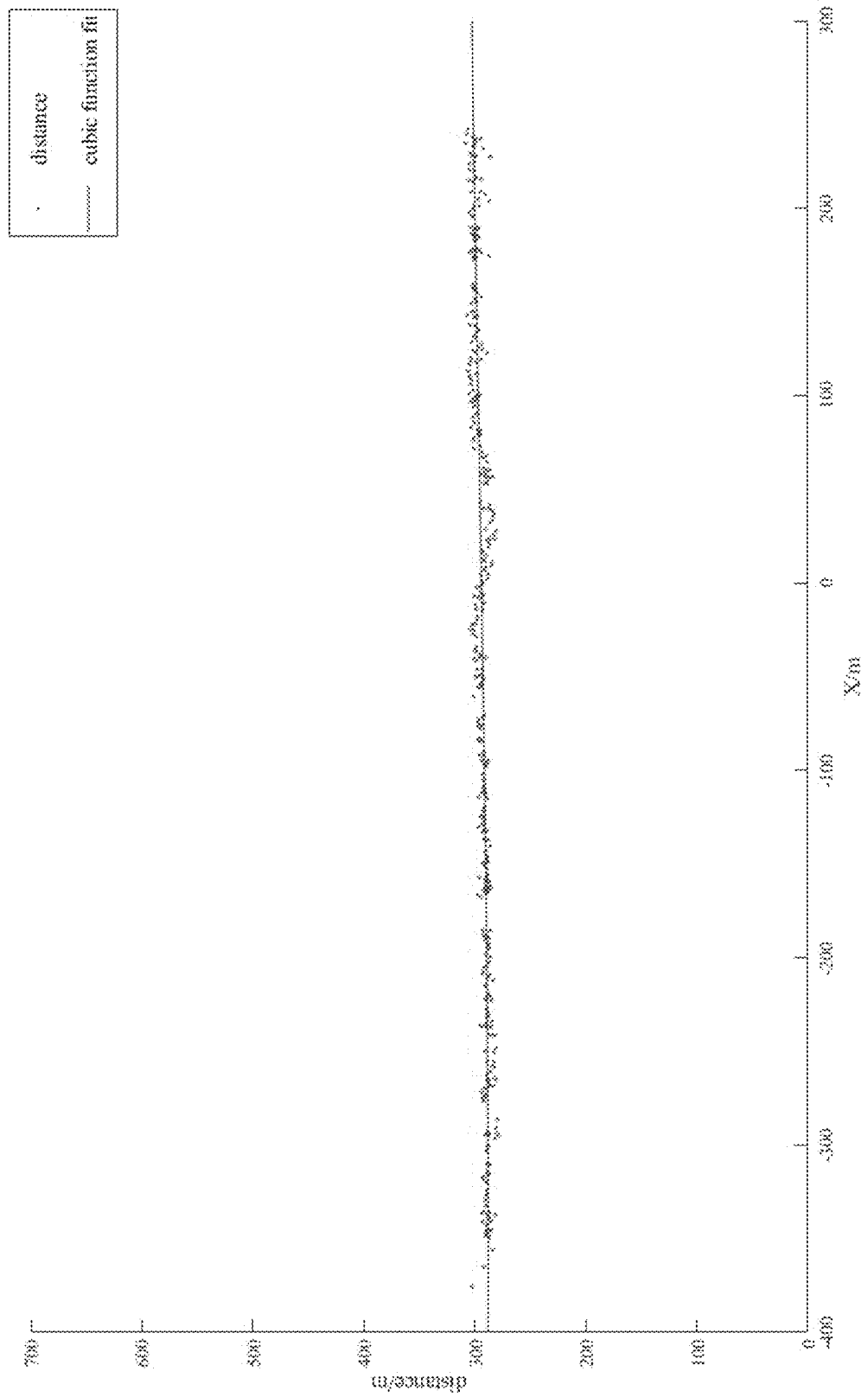
FIG. 18 is a schematic diagram of the bulk cargo carrier tracking and ranging provided by the embodiment of the present invention.

In the experiment, a bulk cargo carrier was used as an example for continuous ranging of vessel targets, as shown in FIG. 18, with coordinates (0,0) being the camera's location. Most of the vessels captured by the binocular camera are in a direct sailing state, that is, the vessels are roughly sailing along a straight route, which shows that for the ranging of bulk cargo carriers, the calculated distance values fluctuate less and remain stable, which is basically consistent with the navigation state of the vessels.

In order to further illustrate the effectiveness of the binocular ranging experiment, the present invention uses the SNDWAY-1000A laser rangefinder for verification. The ranging error of the device within 1000 m is ±0.5 m, and error analysis is carried out based on the distance measured by the rangefinder. In the experiment, 10 vessels were analyzed, and the results are shown in Table 6.

TABLE 6

Comparison results of vessel ranging

| Ship_num | System ranging (m) | Laser ranging (m) | Ranging error (m) | Error rate |
|---|---|---|---|---|
| ship_1 | 105.10 | 103.8 | +1.30 | 1.25% |
| ship_2 | 122.13 | 124.5 | −2.37 | −1.90% |
| ship_3 | 168.31 | 166.3 | +2.01 | 1.21% |
| ship_4 | 198.21 | 195.3 | +2.91 | 1.49% |
| ship_5 | 220.92 | 224.6 | −3.68 | −1.63% |
| ship_6 | 245.35 | 248.5 | −3.15 | −1.27% |
| ship_7 | 279.02 | 275.4 | +3.62 | 1.31% |
| ship_8 | 285.76 | 290.2 | −4.44 | −1.53% |
| ship_9 | 311.26 | 305.8 | +5.46 | 1.79% |
| ship_10 | 348.08 | 355.3 | −7.22 | −2.03% |

Table 6 shows that the binocular stereo vision ranging technology proposed by the present invention can achieve ranging of vessels at different distances. When the laser rangefinder is used as the standard, there is a certain error in the distance calculated by this technology. When the target distance is around 300 m, the error is below ±2%, and when the target distance is greater than 300 m, the error increases because as the target distance increases, the difficulty of detecting and matching the feature points will further increase, which affects the calculation result of parallax, thus causing the error to show an increasing trend to a certain extent, but overall, the error is below±3%. During the navigation of inland vessels, a distance of about 300 m is sufficient for vessels to make corresponding decisions. Therefore, this technology can meet the ranging needs of inland vessels and has important research significance for the development of future intelligent vessels.

It should be noted that the implementation of the present invention can be achieved through hardware, software, or a combination of software and hardware. The hardware can be implemented using dedicated logic; The software can be stored in memory and executed by an appropriate instruction execution system, such as a microprocessor or specialized design hardware. Ordinary technical personnel in this field understand that the above devices and methods can be implemented using computer executable instructions and/or included in processor control code, such as providing such code on carrier media such as disks, CDs, or DVD-ROMs, programmable memory such as read-only memory (firmware), or data carriers such as optical or electronic signal carriers. The device and its modules of the present invention can be implemented by hardware circuits such as ultra-large scale integrated circuits or gate arrays, semiconductors such as logic chips, transistors, or programmable hardware devices such as field programmable gate arrays, programmable logic devices, etc., or by software executed by various types of processors, or by a combination of the aforementioned hardware circuits and software, such as firmware.

The above is only a specific implementation of the present invention, but the scope of protection of the present invention is not limited to this. Any modification, equivalent replacement, and improvement made by any technical personnel familiar with the technical field within the scope of the disclosed technology within the spirit and principles of the present invention should be covered within the scope of protection of the present invention.

What is claimed is:

1. A method for identifying and ranging inland vessels, characterized in that the inland vessel identification and ranging method comprises:
   in a stage of vessel target identification, a MobileNetV1 network is used as a feature extraction module of a YOLO-V4 network model; in a stage of vessel target ranging, a sub-pixel level feature point detection and matching algorithm is proposed based on an ORB algorithm, and a FSRCNN algorithm is used for super-resolution reconstruction of an original low resolution image; in a stage of vessel identification, based on the YOLO-V4 network model, the MobileNetV1 network is used to replace the feature extraction network CSP-Darknet53 of the YOLO-V4 network model; in a stage of vessel ranging, a binocular stereo vision ranging model is established, and the FSRCNN is used for super-resolution reconstruction of the original low resolution image pairs to enhance the vessel feature information; the ORB algorithm is used to achieve feature detection and matching at the sub-pixel level to obtain a parallax value between image pairs, and a depth information of the vessel target is obtained by triangulation principle and coordinate conversion;

The said method for identifying and ranging inland vessels comprises the following steps:

Step 1: Building a binocular stereo vision ranging model;

Step 2: Building a camera calibration model;

Step 3: Building a MobilenetV1-YOLOv4 vessel identification model;

Step 4: Performing vessel feature point detection and matching;

a vessel feature point detection and matching in Step 4 includes:

the FSRCNN model consists of five parts: feature extraction, reduction, mapping, amplification and deconvolution; The first four parts are convolutional layers, and the last part is deconvolution layers;

the FSRCNN directly takes the original low resolution image as an input, and uses a linear rectification function PReLU as the activation function; the FSRCNN uses d 5×5 sized convolutional kernel for feature extraction, s 1×1 sized convolutional kernel for shrinkage, m 3×3 sized convolutions concatenated as mapping layers, and d 1×1 sized convolutional kernels for expansion; At the end of a FSRCNN network, one 9×9 sized convolutional kernel is used for deconvolution to obtain high-resolution images;

PReLU is shown as in the following equation:

$$f(x_i) = \begin{cases} x_i, & x_i > 0 \\ a_i x_i, & x_i \leq 0 \end{cases};$$

a mean square error is used as the loss function during a FSRCNN training, as shown in the following equation:

$$loss = \min_\theta \frac{1}{n} \sum_{i=1}^{n} \left\| F(Y_s^i; \theta) - X^i \right\|_2^2;$$

Where, $Y_s^i$ and $X^i$ are i-th pair of super-resolution images and low-resolution images in a training data, respectively; $F(Y_s^i; \theta)$ is a FSRCNN network output, $\theta$ is a hyperparameter in the FSRCNN network;

the ORB algorithm is used to create feature vectors for a key feature points in the super-resolution image, in order to identify corresponding targets in the super-resolution image, including following steps:

(1) Feature point extraction the ORB algorithm uses a FAST algorithm to find the feature points in the image; if a pixel in the super-resolution image differs from neighboring pixels, then that pixel is the feature point; specific steps are as follows:

1) select a pixel point P in the super-resolution image to be detected, with a pixel value of $I_P$ and a circle centered on P with a radius of 3; There are 16 pixels on the determined circle, represented as $P_1, P_2, \ldots, P_{16}$, respectively;

2) Determine a threshold: t;

3) Calculate difference between all pixel values on the determined circle and the pixel values of P; If there are consecutive N points on the circle that satisfy a following equation, where $I_x$ represents a point among the 16 pixels on the circle, then the point $I_x$ is used as a candidate point, let N=12; For each pixel, the 1st, 9th, 5th, and 13th pixel points among the 16 pixels on the circle are detected; If at least three of the 1st, 9th, 5th, and 13th pixel points meet the following equation, the points are candidate detection points, and maximum suppression is used to delete excess candidate points $$\begin{cases} I_x - I_p > t \\ I_x - I_p < -t \end{cases};$$

(2) BRIEF descriptor creation

ORB algorithm uses BRIEF to create binary descriptors for a detected key feature point, describing feature vectors that only contain 0 and 1; specific steps are as follows:

The image to be detected is processed by Gaussian filter;

2) BRIEF takes the candidate feature point P' as a center point, takes a S×S sized area, randomly selects two points $P_x'$ and $P_y'$ within the area, compares pixel sizes of the two points, and assigns the following values:

$$\tau(p; x, y) := \begin{cases} 1, & p(x) < p(y) \\ 0, & p(x) \geq p(y) \end{cases};$$

Where, $P_x'$ and $P_y'$ are pixel values of random points $x(u_1,v_1)$ and $y(u_2,v_2)$ in the area, respectively;

3) randomly select n pixel pairs in the area of S×S and repeat binary assignment; an encoding process is a description of the key feature points in the super-resolution image, which is a feature descriptor; a value of n is 128, 256 or 512; image features are described by n-bit binary vectors:

$$f_n(p) := \sum_{1 \leq i \leq n} 2^{i-1} \tau(p; x_i, y_i);$$

the ORB algorithm has a characteristic of invariant rotation, using a direction $\theta'$ of key feature points to rotate the BRIEF descriptor; a specific process is as follows:

1) for any feature point in the super-resolution image, n pairs of pixel values located $(x_i, y_i)$ within a S×S neighborhood are represented by a 2×n matrix:

$$S = \begin{pmatrix} x_1, \ldots, x_n \\ y_1, \ldots, y_n \end{pmatrix}$$

2) the direction $\theta'$ of the key feature points obtained using the FAST algorithm: using a neighborhood circle of corner point P'' as an image block B, define a moment of the image block B as:

$$m_{pq} = \sum_{x,y \in B} x^p y^q I(x, y), \, p, q = \{0, 1\}$$

find a centroid of the image block B:

$$C = \left( \frac{m_{10}}{m_{00}}, \frac{m_{01}}{m_{00}} \right),$$

connect a geometric center O of the image block with the centroid C to obtain a direction vector $\overrightarrow{OC}$; At this point, the direction of the key feature points is defined as: $\theta' = \arctan(m_{01}/m_{10})$;

3) Calculate a corresponding rotation matrix $R_\theta$ and S: from the direction of the key feature points calculated in Step 2), it can be seen that:

$$R_\theta = \begin{bmatrix} \cos\theta & -\sin\theta \\ \cos\theta & \cos\theta \end{bmatrix},$$

-therefore, $S_\theta = R_\theta S$;

4) calculate a rotation descriptor:

$$g_n(p, \theta) := f_n(p) | (x_i, y_i) \in S_\theta$$

where, $$f_n(p) := \sum_{1 \leq i \leq n} 2^{i-1} \tau(p; x_i, y_i),$$

is the descriptor of BRIEF; thus, the rotation invariance of the ORB algorithm is achieved;

Feature point matching:

calculate a Hamming distance between the feature descriptors in an image alignment, which means calculating a similarity between the key feature points if it is less than a given threshold, then two key feature points will be matched.

2. The method for identifying and ranging inland vessels as claimed in claim 1, characterized in that the building of the binocular stereo vision ranging model in Step 1 includes:

the binocular stereo vision ranging technology perceives a depth of a surrounding environment through anthropomorphic methods, and obtains 3D information of targets in a real world; According to the triangulation principle, two parallel and co-planar cameras are used to capture and image a same scene from different angles, and the depth information of the vessel is recovered by calculating the parallax value between the image pairs; an optical center positions of left and right cameras are $O_l$ and $O_r$, respectively, with $O_l X_l Y_l Z_l$ and $O_r X_r Y_r Z_r$ being the coordinate systems of the left and right cameras; b is a horizontal distance between the optical centers $O_l$ and $O_r$ of the camera, known as a baseline distance; f is a focal length of the left and the right cameras; For 3D spatial point P(X,Y,Z), a projection point coordinates in the imaging coordinate system of the left and right cameras are $p(x_l, y_l)$ and $p(x_r, y_r)$, respectively; project a 3D model onto the XOZ plane; According to a principle of triangle similarity, it can be concluded that:

$$\begin{cases} \dfrac{z}{f} = \dfrac{x}{x_l} \\ \dfrac{z}{f} = \dfrac{x-b}{x_r} \\ \dfrac{z}{f} = \dfrac{y}{y_l} = \dfrac{y}{y_r} \end{cases};$$

a calculation leads to:

$$\begin{cases} z = \dfrac{f*b}{x_l - x_r} = \dfrac{f*b}{d} \\ x = \dfrac{x_l * z}{f} \\ f = \dfrac{y_l * z}{f} \text{ or } f = \dfrac{y_r * z}{f} \end{cases};$$

Where, $x_l - x_r$ is called parallax d, which represents an offset of point P from the corresponding projection point on the left and right cameras; z is a depth value of point P; When parameters f and b are determined, a depth z of a target point is obtained by calculating a difference between the coordinates x or y of the target point in a pixel coordinate system of the left and right cameras;

calculate the projection point coordinates $p_l(x_l, y_l)$ and $p_r(x_r, y_r)$ of the point on the left and right camera imaging planes, and obtain a 3D information of the point through a transformation between coordinate systems, thereby obtaining the depth information of the target point P;

the building of a camera calibration model in Step 2 includes:

According to a principle of pinhole imaging, when a point $P_w(X_w, Y_w, Z_w)$ is located in a 3D world coordinate system, the projection coordinate of the point in a camera coordinate system is $P_c(X_c, Y_c, Z_c)$, the coordinate in an image coordinate system is P(x,y), pixel coordinates P(u,v), and $O_c$ in the pixel coordinate system are the camera optical center position, and $O_c Z_c$ is the camera optical axis of the left and right cameras; a mathematical expression between $P_w(X_w, Y_w, Z_w)$ and the pixel coordinate P(u,v) is:

$$Z_c \begin{pmatrix} u \\ v \\ 1 \end{pmatrix} = \begin{pmatrix} \dfrac{1}{dx} & 0 & u_0 \\ 0 & \dfrac{1}{dy} & v_0 \\ 0 & 0 & 1 \end{pmatrix} \begin{pmatrix} f & 0 & 0 & 0 \\ 0 & f & 0 & 0 \\ 0 & 0 & f & 0 \end{pmatrix} \begin{pmatrix} R & T \\ \vec{0} & 1 \end{pmatrix} \begin{pmatrix} X_w \\ Y_w \\ Z_w \\ 1 \end{pmatrix};$$

$$= \begin{pmatrix} f_x & 0 & u_0 & 0 \\ 0 & f_y & v_0 & 0 \\ 0 & 0 & 1 & 0 \end{pmatrix} \begin{pmatrix} R & T \\ \vec{0} & 1 \end{pmatrix} \begin{pmatrix} X_w \\ Y_w \\ Z_w \\ 1 \end{pmatrix}$$

Let $$K = \begin{pmatrix} f_x & 0 & u_0 & 0 \\ 0 & f_y & v_0 & 0 \\ 0 & 0 & 1 & 0 \end{pmatrix},$$

referred to as an internal parameter matrix of the left and right cameras, then a mathematical expression between $P_w(X_w, Y_w, Z_w)$ and the pixel coordinate P(u,v) is simplified as follows:

$$Z_c \begin{pmatrix} u \\ v \\ 1 \end{pmatrix} = K \begin{pmatrix} R & T \\ \vec{0} & 1 \end{pmatrix} \begin{pmatrix} X_w \\ Y_w \\ Z_w \\ 1 \end{pmatrix};$$

Where, $$f_x = \dfrac{f}{d_x}, f_y = \dfrac{f}{d_y}, d_x \text{ and } d_y$$

respectively represent physical dimensions of each pixel in the x and y directions of the image plane, $u_0$ and $v_0$ represent the coordinates of the image center point, R represents the rotation matrix, and T represents a translation vector, which constitute an external parameter matrix $$\begin{pmatrix} R & T \\ \vec{0} & 1 \end{pmatrix}$$

of the camera, and the external parameter matrix and internal parameter matrix of the left and right cameras can be obtained by the camera calibration.

3. The method for identifying and ranging inland vessels as claimed in claim 1, characterized in that the building of a MobilenetV1-YOLOv4 vessel identification model in Step 3 includes:

building a vessel target identification model based on the YOLOv4 model, with a network structure consisting of Backbone, Neck and Head; the YOLOv4 network uses CSP Dark net53 as the backbone network for feature extraction, combined with Cross Stage Partial (CSP) and residual network; the Neck module consists of a spatial pyramid pooling and a path aggregation network; the spatial pyramid pooling consists of three different scale pooling layers: 5×5 9×9 and 13×13; the path aggregation network serves as a feature fusion module, adding bottom-up paths on top of the feature pyramid network; the Head module is used to detect targets, and output feature maps of three different sizes: 13×13, 26, 26×26 and 52×52;

if the size of an input image is $D_K \times D_K$, an input channel is M, the number of convolutional kernels is N, and a convolutional kernel size is $D_F \times D_F$ then an output feature map size is $D_C \times D_C$ and an output channel is N;

in traditional convolutional operations, number of parameters that need to be calculated is: $Params1 = D_F \times D_F \times M \times N$;

the calculation of the parameters for a depth-wise separable convolution is divided into two parts: one is a depth convolution parameter, and the other is a point convolution parameter, where the size of a point convolution kernel is 1×1; therefore, the parameters to be calculated are: $Params2 = D_F \times D_F \times M + M \times N$;

a ratio of parameters between the depth-wise separable convolution and standard convolution methods is:

$$\frac{Params2}{Params1} = \frac{D_F \times D_F \times M + M \times N}{D_F \times D_F \times M \times N} = \frac{1}{N} + \frac{1}{D_F^2};$$

the MobileNetv1 is based on the depth-wise separable convolution module, which uses a 3×3 convolution kernel to perform depth convolution and extract feature information; a BN layer and a ReLU layer are connected between the depth convolution and the point convolution, and feature information is output through the BN layer and the ReLU layer after point convolution; the MobileNetv1 has a total of 28 layers; the first layer is a standard 3×3 convolution, with 13 depth-wise separable convolution modules built; before the fully connected layer, an average pooling layer is used to reduce the spatial resolution to 1, and the softmax layer is used to output probability for each category to be identified;

replace the backbone network CSPDarknet53 of YOLOv4 with MobileNetv1, connect a three different scale feature layers extracted by MobileNetv1 with the spatial pyramid pooling and path aggregation network module of the traditional YOLOv4 model, and build the Mobilenetv1-YOLOv4 target detection model.

4. A computer device, characterized in that the said computer device comprises a memory and a processor, wherein the memory stores a computer program; when the computer program is executed by the processor, the said processor executes the steps of said method for identifying and ranging inland vessels as claimed in claim 1.

5. A computer-readable non-transitory storage medium containing said computer program that, when executed by said processor, causes said processor to execute the steps of said method for identifying and ranging inland vessels as claimed in claim 1.

* * * * *